(12) United States Patent
Okuyama

(10) Patent No.: US 11,703,735 B2
(45) Date of Patent: Jul. 18, 2023

(54) DISPLAY DEVICE

(71) Applicant: Japan Display Inc., Tokyo (JP)

(72) Inventor: Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 1 day.

(21) Appl. No.: 17/450,717

(22) Filed: Oct. 13, 2021

(65) Prior Publication Data

US 2022/0026752 A1 Jan. 27, 2022

Related U.S. Application Data

(63) Continuation of application No. PCT/JP2020/006898, filed on Feb. 20, 2020.

(30) Foreign Application Priority Data

Apr. 16, 2019 (JP) .................................. 2019-077934

(51) Int. Cl.
*G02F 1/1368* (2006.01)
*G02F 1/1362* (2006.01)

(52) U.S. Cl.
CPC ...... *G02F 1/1368* (2013.01); *G02F 1/136286* (2013.01)

(58) Field of Classification Search
CPC .................................................. G02F 1/1368
See application file for complete search history.

(56) References Cited

U.S. PATENT DOCUMENTS

| 9,910,335 B1 | 3/2018 | Wang et al. |
| 2005/0174529 A1* | 8/2005 | Fukushima ........... G02F 1/1323 349/197 |
| 2010/0165450 A1 | 7/2010 | Okuyama et al. |
| 2011/0141551 A1 | 6/2011 | Uchida et al. |
| 2012/0181560 A1* | 7/2012 | Hiramatsu ............... H05K 1/02 174/250 |

(Continued)

FOREIGN PATENT DOCUMENTS

| CN | 106094338 A | 11/2016 |
| CN | 108628024 A | 10/2018 |

(Continued)

OTHER PUBLICATIONS

International Search Report dated Apr. 14, 2020 in PCT/JP2020/006898 filed on Feb. 20, 2020, 3 pages.

(Continued)

*Primary Examiner* — Sang V Nguyen
(74) *Attorney, Agent, or Firm* — Maier & Maier, PLLC

(57) ABSTRACT

According to one embodiment, a display device includes a light-emitting element, a first substrate including a first transparent substrate, a first pixel electrode, and a second pixel electrode, a second substrate including a second transparent substrate including a side surface opposing the light-emitting element and a common electrode overlapping the first pixel electrode and the second pixel electrode and a liquid crystal layer provided between the first substrate and the second substrate and containing a polymer and liquid crystal molecules, and the first pixel electrode is provided between the light-emitting element and the second pixel electrode, and an electrode area of the first pixel electrode is smaller than that of the second pixel electrode.

15 Claims, 20 Drawing Sheets

(56) References Cited

U.S. PATENT DOCUMENTS

| 2015/0109763 | A1 |   | 4/2015  | Shinkai et al. |              |
|--------------|----|---|---------|----------------|--------------|
| 2016/0116811 | A1 | * | 4/2016  | Zheng          | G02F 1/133305 |
|              |    |   |         |                | 349/38       |
| 2018/0059448 | A1 | * | 3/2018  | Wang           | G02F 1/139   |
| 2019/0155104 | A1 |   | 5/2019  | Li et al.      |              |
| 2021/0349344 | A1 | * | 11/2021 | Koito          | G02F 1/13439 |

FOREIGN PATENT DOCUMENTS

| JP | 2010-156811 A    | 7/2010  |
| JP | 2011-142065 A    | 7/2011  |
| JP | 2019-174704 A    | 10/2019 |
| WO | WO 2013/168638 A1 | 11/2013 |
| WO | WO 2018/171261 A1 | 9/2018  |

OTHER PUBLICATIONS

Office Action dated Sep. 27, 2022, in corresponding Japanese Application No. 2019-077934; 8 pages.

* cited by examiner

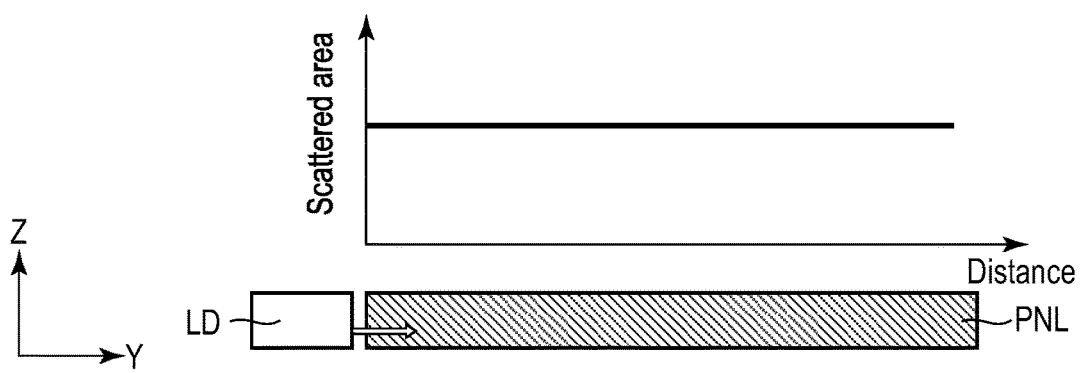
F I G. 5A
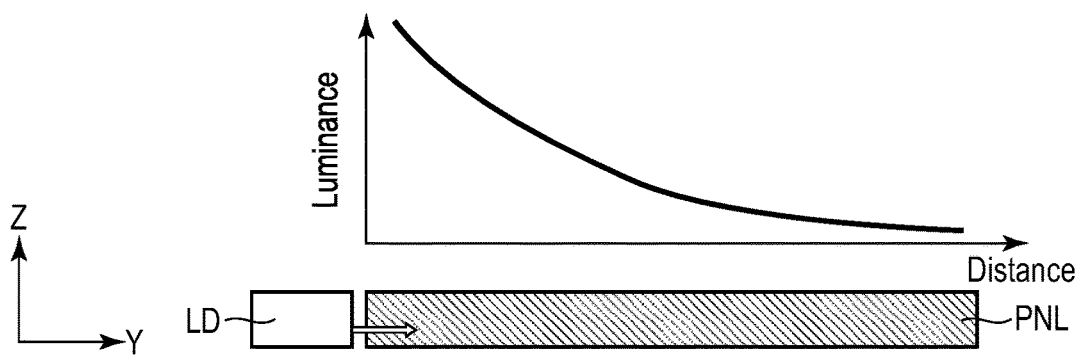
F I G. 5B
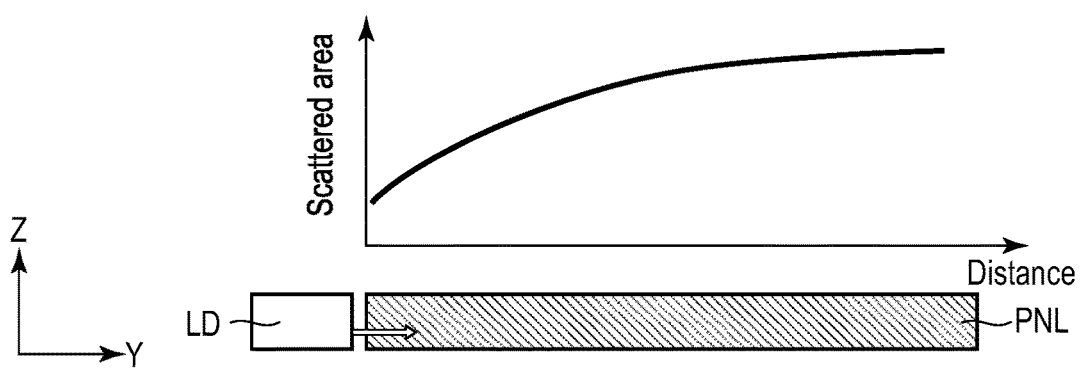
F I G. 6A
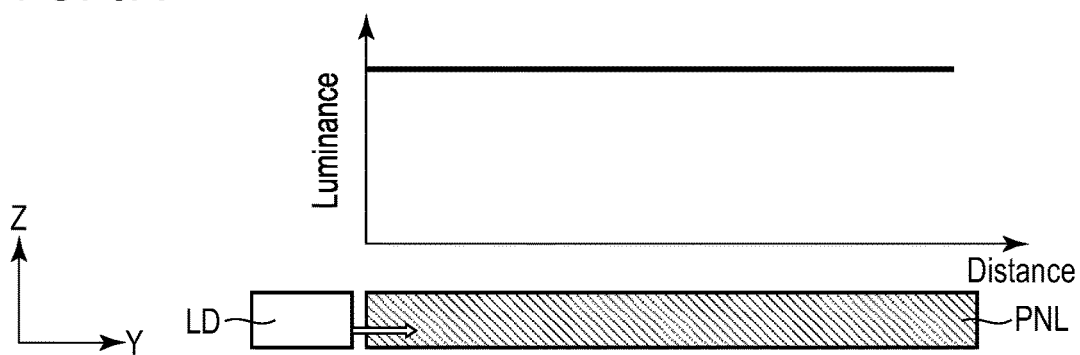
F I G. 6B

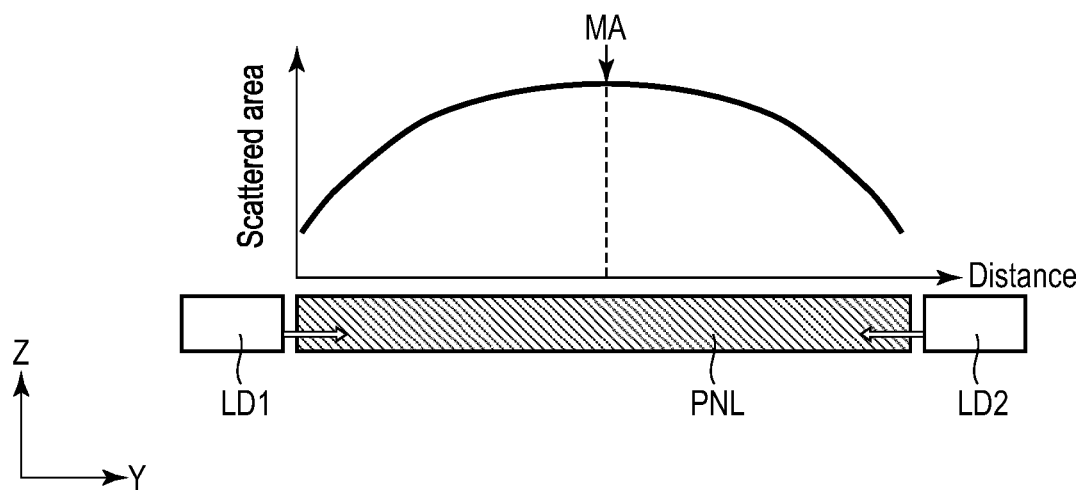
F I G. 7A
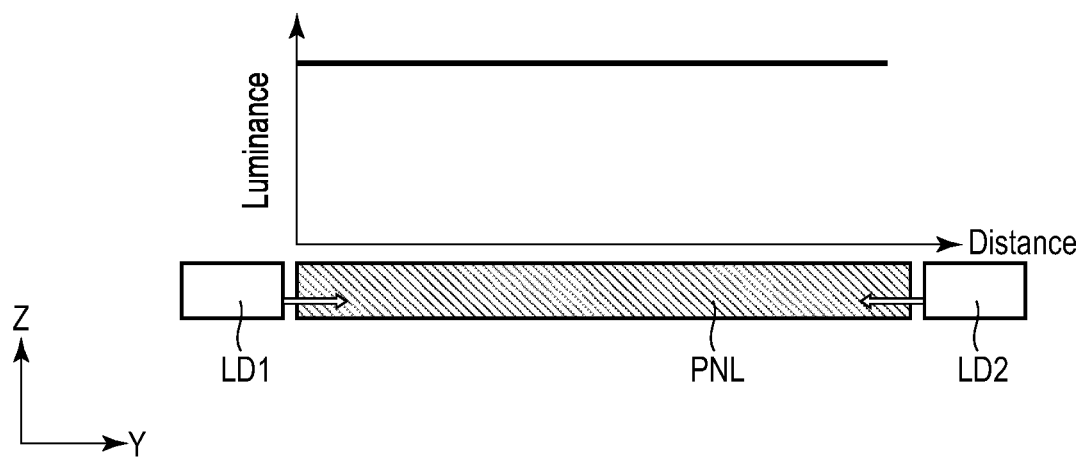
F I G. 7B

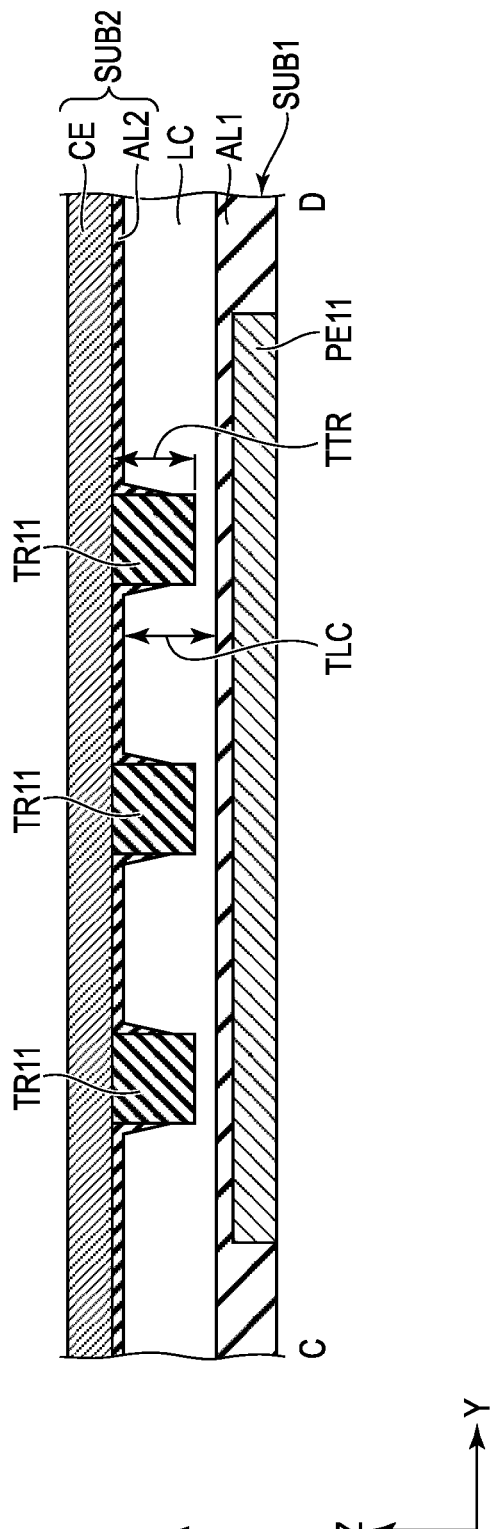
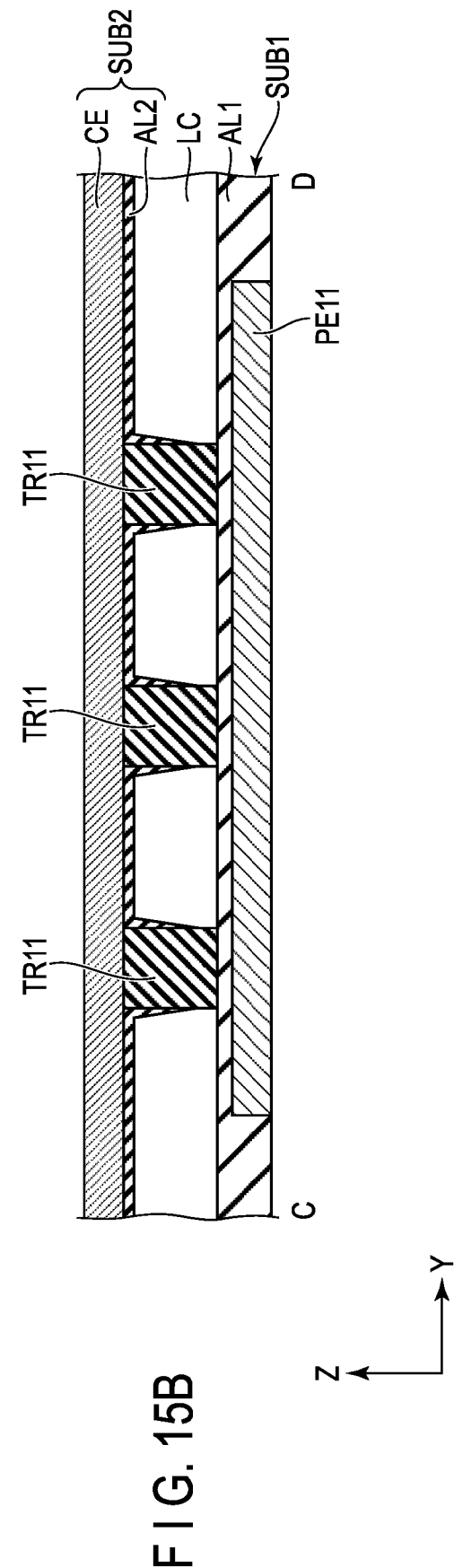
FIG. 15A
FIG. 15B

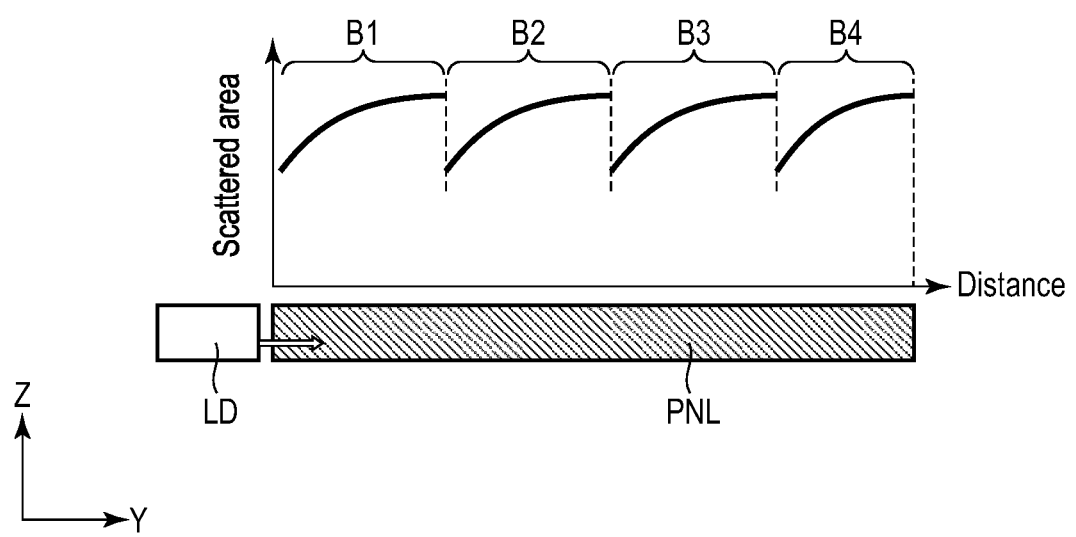
F I G. 17

DISPLAY DEVICE

CROSS-REFERENCE TO RELATED APPLICATIONS

This application is a Continuation Application of PCT Application No. PCT/JP2020/006898, filed Feb. 20, 2020 and based upon and claiming the benefit of priority from Japanese Patent Application No. 2019-077934, filed Apr. 16, 2019, the entire contents of all of which are incorporated herein by reference.

FIELD

Embodiments described herein relate generally to a display device.

BACKGROUND

In recent years, various illumination devices comprising a light modulating element that exhibits scattering of or transparency to light have been proposed. For example, a light modulating element comprises a polymer dispersed liquid crystal layer as a light modulating layer. The light modulating element is disposed behind a light guide and scatters light entering from a side surface of the light guide.

BRIEF DESCRIPTION OF THE DRAWINGS

FIG. 5A is a diagram illustrating a luminance distribution in a comparative example.

FIG. 5B is a diagram illustrating the luminance distribution in the comparative example.

FIG. 6A is a diagram illustrating a luminance distribution in a first embodiment.

FIG. 6B is a diagram illustrating the luminance distribution in the first embodiment.

FIG. 7A is a diagram illustrating a luminance distribution in a second embodiment.

FIG. 7B is a diagram illustrating the luminance distribution in the second embodiment.

FIG. 15A is a cross-sectional view taken along line C-D shown in FIG. 14.

FIG. 15B is a cross-sectional view taken along line C-D shown in FIG. 14.

FIG. 17 is a diagram illustrating distribution of the scattered area in the fourth configuration example.

DETAILED DESCRIPTION

Figure 1:
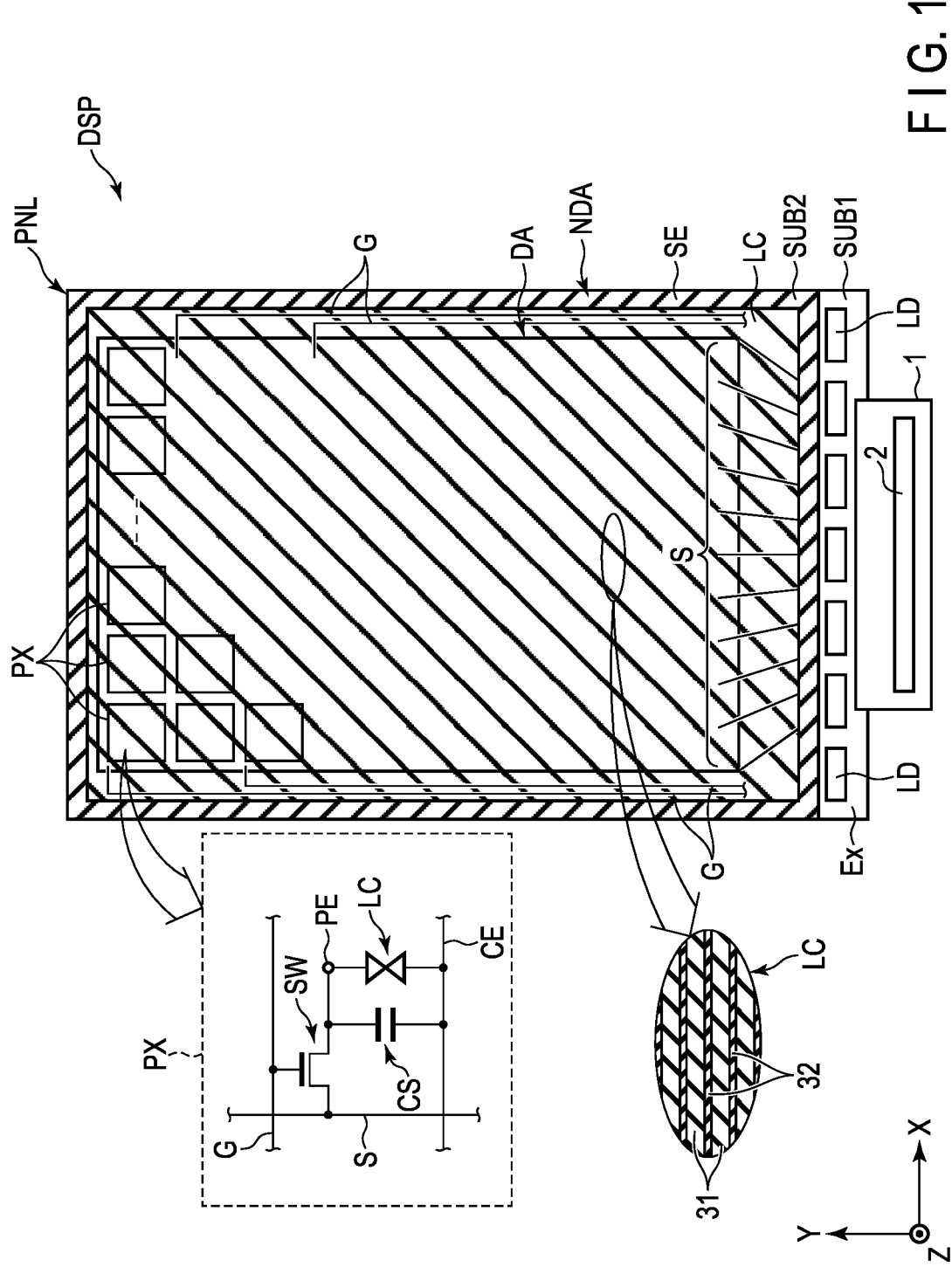
FIG. 1 is a plan view showing a configuration example of a display device DSP according to an embodiment.

In general, according to one embodiment, a display device comprises a light-emitting element, a first substrate comprising a first transparent substrate, a first switching element and a second switching element, a first pixel electrode electrically connected to the first switching element and a second pixel electrode electrically connected to the second switching element, a second substrate comprising a second transparent substrate comprising a side surface opposing the light-emitting element and a common electrode overlapping the first pixel electrode and the second pixel electrode and a liquid crystal layer provided between the first substrate and the second substrate and containing a polymer and liquid crystal molecules, and the first pixel electrode is provided between the light-emitting element and the second pixel electrode, and an electrode area of the first pixel electrode is smaller than an electrode area of the second pixel electrode.

According to another embodiment, a display device comprises a light-emitting element, a first substrate comprising a first transparent substrate, a first switching element and a second switching element, a first pixel electrode electrically connected to the first switching element and a second pixel electrode electrically connected to the second switching element, a second substrate comprising a transparent substrate comprising a side surface opposing the light-emitting element and a common electrode overlapping the first pixel electrode and the second pixel electrode, a liquid crystal layer provided between the first substrate and the second substrate and containing strip-shaped polymer and liquid crystal molecules, a first transparent resin overlapping the first pixel electrode and a second transparent resin overlapping the second pixel electrode, and the first pixel electrode being provided between the light-emitting element and the second pixel electrode, an electrode area of the first pixel electrode being equivalent to an electrode area of the second pixel electrode, the first transparent resin and the second transparent resin being formed of a material different from that of the polymer and the liquid crystal molecules, and an overlapping area between the first pixel electrode and the first transparent resin is greater than an overlapping area between the second pixel electrode and the second transparent resin.

According to the present embodiments, a display device which can suppress degradation of display quality can be provided.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

FIG. 1 is a plan view showing a configuration example of the display device DSP of one embodiment. For example, a first direction X, a second direction Y and a third direction Z are orthogonal to each other, but may intersect at an angle other than ninety degrees. The first direction X and the second direction Y correspond to directions parallel to a main surface of a substrate which constitutes the display device DSP, and the third direction Z corresponds to a thickness direction of the display device DSP. When assumed that an observation position for observing the display device DSP is located at a tip side of the arrow indicating the third direction Z, a view from this observation position toward the X-Y plane defined by the first direction X and the second direction Y is called plan view.

In this embodiment, as an example of the display device DSP, a liquid crystal display device to which a polymer dispersed liquid crystal is applied will be described. The display device DSP comprises a display panel PNL, a wiring substrate 1, an IC chip 2 and a light-emitting element LD.

The display panel PNL comprises a first substrate SUB1, a second substrate SUB2, a liquid crystal layer LC and a sealant SE. The first substrate SUB1 and the second substrate SUB2 are each formed into a flat plate shape which is parallel to the X-Y plane. The first substrate SUB1 and the second substrate SUB2 overlap each other in plan view. The first substrate SUB1 and the second substrate SUB2 are attached to each other by the sealant SE. The liquid crystal layer LC is held between the first substrate SUB1 and the second substrate SUB2, and is sealed by the sealant SE. In FIG. 1, the liquid crystal layer LC and the sealant SE are respectively indicated by different hatch lines. As enlarged and schematically shown in FIG. 1, the liquid crystal layer LC comprises a polymer-dispersed liquid crystal containing a polymer 31 and liquid crystal molecules 32. For example, the polymer 31 is a liquid crystalline polymer. The polymer 31 is formed into a strip shape extending along the first direction X. The liquid crystal molecules 32 are dispersed in the spaces in the polymer 31 so that their longitudinal axes are aligned along the first direction X. Each of the polymer 31 and liquid crystal molecules 32 has optical anisotropy or refractive index anisotropy. The responsiveness of the polymer 31 to electric fields is lower than that of the liquid crystal molecules 32 to electric fields.

For example, the alignment direction of the polymer 31 does not substantially vary regardless of the presence or absence of an electric field. On the other hand, the alignment direction of the liquid crystal molecules 32 varies in response to the electric field when a voltage higher than the threshold is applied to the liquid crystal layer LC. While no voltage is applied to the liquid crystal layer LC, the optical axes of the polymer 31 and liquid crystal molecules 32 are parallel to each other, and light entering the liquid crystal layer LC is not substantially scattered in the liquid crystal layer LC and transmitted therethrough (transparent state). When a voltage is applied to the liquid crystal layer LC, the optical axes of the polymer 31 and liquid crystal molecules 32 cross each other, and light entering the liquid crystal layer LC is scattered in the liquid crystal layer LC (scattered state).

The display panel PNL comprises a display area DA that displays images, and a frame-shaped non-display area NDA that surrounds the display area DA. The sealant SE is provided in the non-display area NDA. The display area DA comprises pixels PX arranged in a matrix in the first and second directions X and Y.

As enlargedly shown in FIG. 1, each pixel PX comprises a switching element SW, a pixel electrode PE, a common electrode CE, a liquid crystal layer LC and the like. The switching element SW is constituted, for example, by a thin-film transistor (TFT) and is electrically connected to a respective scanning line G and a respective signal line S.

The scanning line G is electrically connected to the switching elements SW of those of the pixels PX arranged in the first direction X. The signal line S is electrically connected to the switching elements SW of those of the pixels PX arranged in the second direction Y. The pixel electrode PE is electrically connected to the switching element SW. The common electrode CE is commonly provided for a plurality of pixel electrodes PE. Each of the pixel electrodes PE opposes the common electrode CE in the third direction Z. The liquid crystal layer LC (particularly, the liquid crystal molecules 32) is driven by the electric field generated between the pixel electrodes PE and the common electrode CE. The capacitance CS is formed, for example, between an electrode of the same potential as that of the common electrode CE and an electrode of the same potential as that of the respective pixel electrode PE.

As will be explained later, the scanning lines G, the signal lines S, the switching elements SW and the pixel electrodes PE are provided on the first substrate SUB1, and the common electrodes CE are provided on the second substrate SUB2. In the first substrate SUB1, the scanning lines G and the signal lines S are electrically connected to the wiring substrate 1 or the IC chip 2.

The wiring substrate 1 is electrically connected to an extended portion Ex of the first substrate SUB1. The wiring substrate 1 is a flexible printed circuit board which can be bent. The IC chip 2 is electrically connected to the wiring substrate 1. The IC chip 2 incorporates, for example, a display driver that outputs signals necessary for image display. Note that the IC chip 2 may be electrically connected to the extended portion Ex.

The light-emitting elements LD overlap the extended portion Ex in plan view. The light-emitting elements LD are arranged with intervals therebetween along the first direction X.

Figure 2:
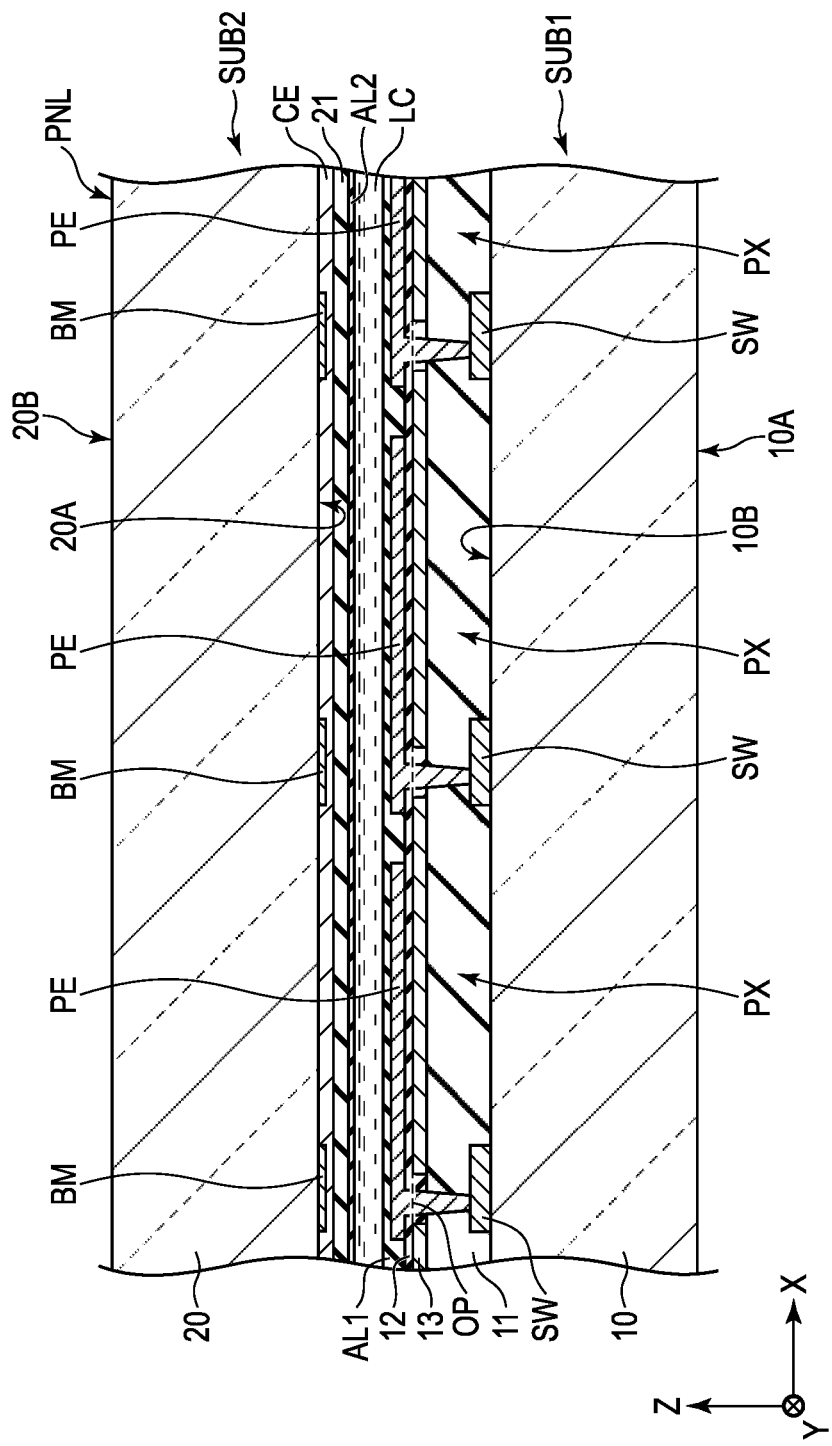
FIG. 2 is a cross-sectional view showing a first configuration example of a display panel PNL shown in FIG. 1.

FIG. 2 is a cross-sectional view showing a first configuration example of the display panel PNL shown in FIG. 1. The liquid crystal layer LC is provided between the first substrate SUB1 and the second substrate SUB2.

The first substrate SUB1 comprises a transparent substrate 10, insulating films 11 and 12, a capacitive electrode 13, switching elements SW, pixel electrodes PE, and an alignment film AL1. The transparent substrate 10 comprises a main surface (lower surface) 10A and a main surface (upper surface) 10B on the opposite side to the main surface 10A. The switching elements SW are provided on a main surface 10B side. The insulating film 11 covers the switching elements SW. Note that the scanning lines G and the signal lines S shown in FIG. 1 are disposed between the transparent substrate 10 and the insulating film 11, but here they are omitted from the illustration. The capacitive electrode 13 is disposed between the insulating films 11 and 12. Each pixel electrode PE is disposed between the insulating film 12 and the alignment film AL1 for the respective pixel PX. That is, the capacitive electrode 13 is provided between the transparent substrate 10 and the respective pixel electrodes PE. The pixel electrodes PE are electrically connected to the respective switching elements SW through openings OP of the capacitive electrode 13. The pixel electrode PE overlaps the capacitive electrode 13 across the insulating film 12, thus forming the capacitance CS of each pixel PX. The alignment film AL1 covers the pixel electrodes PE. The alignment film AL1 is in contact with the liquid crystal layer LC.

The second substrate SUB2 comprises a transparent substrate 20, light-shielding layers BM, a common electrode CE, an insulating film 21 and an alignment film AL2. The transparent substrate 20 comprises a main surface (lower surface) 20A and a main surface (upper surface) 20B on the opposite side to the main surface 20A. The main surface 20A of the transparent substrate 20 opposes the main surface 10B of the transparent substrate 10. The light-shielding layers BM and the common electrode CE are disposed on a main surface 20A side. For example, the light-shielding layers BM are disposed directly above the respective switching elements SW and directly above the respective scanning lines G and the respective signal lines S, which are not shown in the figure. The common electrode CE is disposed over a plurality of pixels PX and opposes a plurality of pixel electrodes PE in the third direction Z. Further, the common electrode CE covers the light-shielding layers BM. The common electrode CE is electrically connected to the capacitive electrode 13 and is at the same potential as that of the capacitive electrode 13. The insulating film 21 covers the common electrode CE. The alignment film AL2 covers the insulating film 21. The alignment film AL2 is in contact with the liquid crystal layer LC.

The transparent substrate 10 and the transparent substrate 20 are insulating substrates such as of glass substrate or plastic substrate. The insulating film 11 includes a transparent inorganic insulating material such as silicon oxide, silicon nitride or silicon oxynitride, and a transparent organic insulating material such as acrylic resin. The insulating film 12 is an inorganic insulating film such as of silicon nitride. The insulating film 21 is a transparent organic insulating film such as of acrylic resin. The capacitive electrode 13, the pixel electrodes PE, and the common electrode CE are transparent electrodes formed of a transparent conductive material such as indium tin oxide (ITO) and indium zinc oxide (IZO). The light-shielding layers BM each may be an insulating layer or a conductive layer with lower resistance than that of the common electrode CE. In the case where the light-shielding layers BM are conductive layers, the resistance of the common electrode CE is lowered by electrically connecting the common electrode to the light-shielding layers BM. The alignment films AL1 and AL2 are horizontal alignment films having an alignment restriction force that is substantially parallel to the X-Y plane. For example, the alignment films AL1 and AL2 are subjected to alignment treatment along the first direction X. Note that the alignment treatment may be rubbing treatment or photo-alignment treatment.

Figure 3:
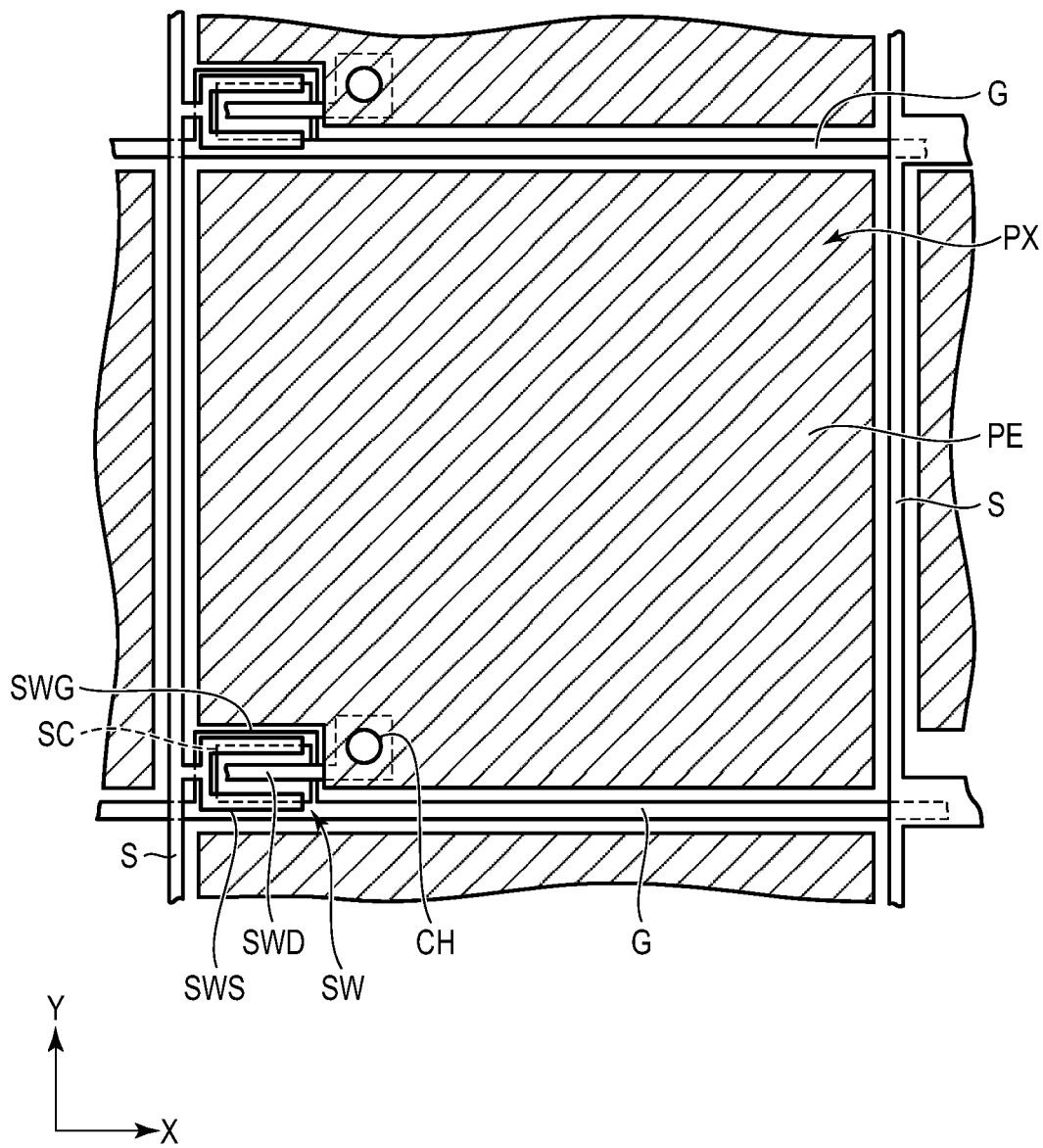
FIG. 3 is a plan view showing an example of a pixel PX shown in FIG. 2.

FIG. 3 is a plan view of an example of the pixel PX shown in FIG. 2. The scanning lines G extend along the first direction X, and the signal lines S extend along the second direction Y. The switching element SW is provided at the intersection of each scanning line G and the respective signal line S. The switching element SW comprises a semiconductor layer SC. The semiconductor layer SC overlaps a gate electrode SWG, which is integrated with the scanning line G. A source electrode SWS, which is integrated with the signal line S and a drain electrode SWD are each electrically connected to the semiconductor layer SC. Each pixel electrode PE is provided between each adjacent pair of scanning lines G and also each adjacent pair of signal lines S. The pixel electrode PE overlaps the respective drain electrode SWD and is electrically connected to the switching element SW through the contact hole CH.

Figure 4:
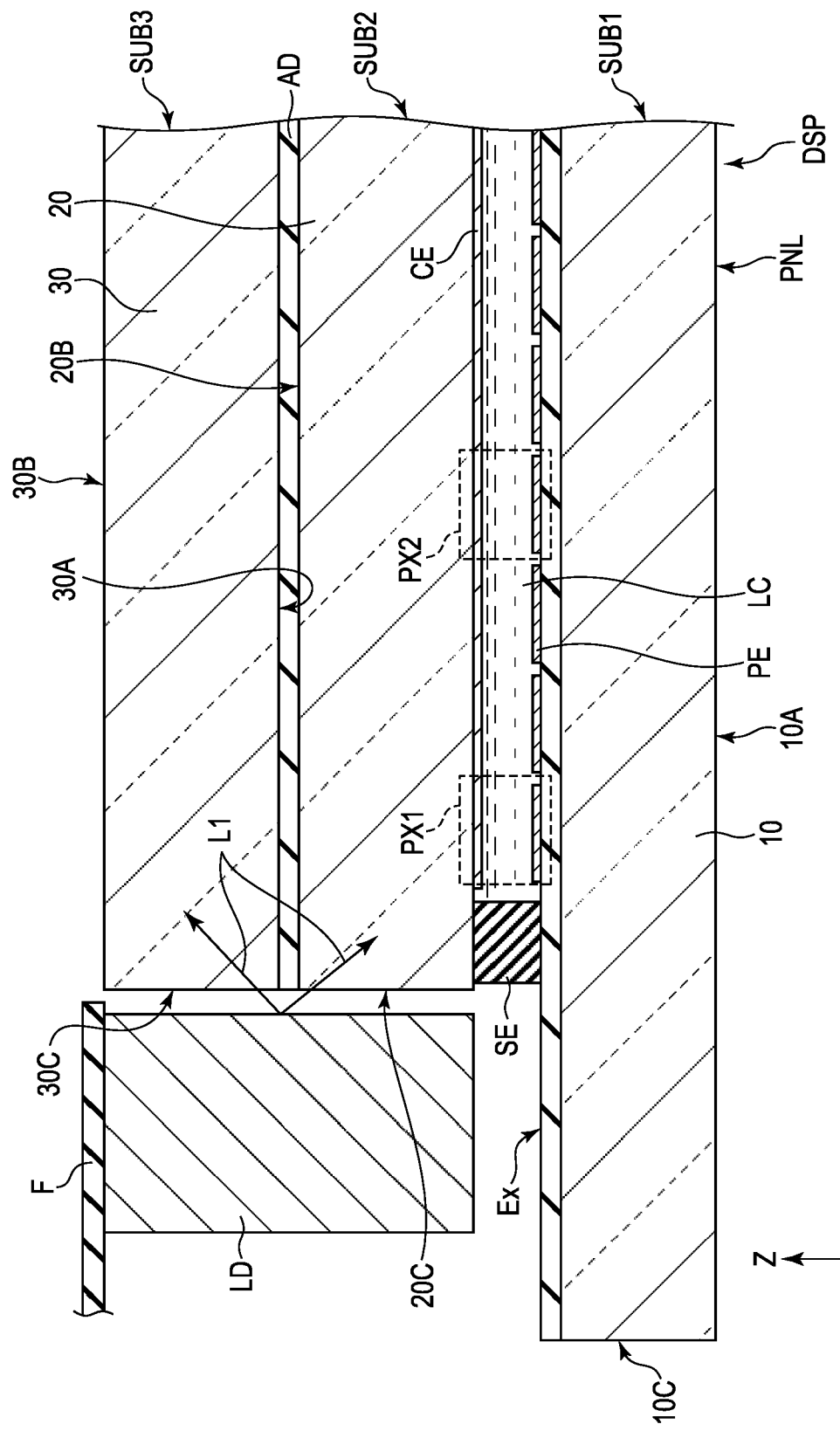
FIG. 4 is a cross-sectional view showing an example of the display device DSP of this embodiment.

FIG. 4 is a cross-sectional view showing an example of the display device DSP of this embodiment. Note that as to the display panel PNL, only the main parts are shown in the figure.

The display device DSP comprises a transparent substrate 30. The transparent substrate 30 is adhered to the transparent substrate 20 by a transparent adhesive layer AD. The transparent substrate 20 is located between the liquid crystal layer LC and the transparent substrate 30 in the third direction Z. The transparent substrate 30 is an insulating substrate such as of glass substrate or plastic substrate, and has a refractive index equivalent to that of the transparent substrates 10 and 20. The transparent substrate 30 comprises a main surface (lower surface) 30A, a main surface (upper surface) 30B on an opposite side to the main surface 30A, and a side surface 30C. The adhesive layer AD is interposed between the main surface 20B of the transparent substrate 20 and the main surface 30A of the transparent substrate 30. The adhesive layer AD has a refractive index equivalent to that of the transparent substrates 20 and 30. The term "equivalent" here is not limited to the case where the difference in refractive index is zero, but includes the case where the difference in refractive index is 0.03 or less.

The transparent substrate 10 comprises a side surface 10C, and the transparent substrate 20 comprises a side surface 20C. The extended portion Ex corresponds to the region between the side surface 10C and the side surface 20C along the second direction Y. The side 30C is located directly above the side surface 20C.

The light emitting element LD opposes the side surface 20C and the side 30C in the second direction Y. The light emitting element LD is electrically connected to the wiring substrate F. The light-emitting element LD is, for example, a light-emitting diode, and comprises a red-emitting portion, a green-emitting portion and a blue-emitting portion, which will not be described in detail. A transparent light guide may be disposed between the light emitting element LD and the side surfaces 20C and 30C.

Next, with reference to FIG. 4, light L1 emitted from the light-emitting element LD will be explained.

The light emitting element LD emits light L1 toward the side surfaces 20C and 30C. The light L1 emitted from the light emitting element LD travels along the direction of the arrow indicating the second direction Y, and enters the transparent substrate 20 from the side surface 20C and the transparent substrate 30 from the side 30C. The light L1 entering the transparent substrates 20 and 30 travels through inside the display panel PNL while being repeatedly reflected. The light L1 entering the liquid crystal layer LC to which no voltage is applied is transmitted through the liquid crystal layer LC without being substantially scattered. The light L1 entering the liquid crystal layer LC to which a voltage is applied is scattered by the liquid crystal layer LC. The display device DSP can be observed from the main surface 10A side and also from the main surface 30B side. Further, even if the display device DSP is observed from the main surface 10A side or from the main surface 30B side, the background of the display device DSP can be observed through the display device DSP.

As shown in FIG. 4, the display panel PNL comprises pixels PX1 and PX2. The pixel PX1 is provided between the light emitting element LD and the pixel PX2 in the second direction Y. In other words, the pixel PX1 is provided on a side closer to the light emitting element LD, and the pixel PX2 is provided on a side away from the light emitting element LD.

Basic Concept

First, the basic concept of this embodiment will be explained with reference to FIGS. 5A and 5B, 6A and 6B, and 7A and 7B.

In each of FIGS. 5A, 6A and 7A, the horizontal axis indicates the distance along the second direction Y from the light emitting element LD, and the vertical axis indicates the scattered area of each pixel PX. The scattered area corresponds to the area of the region where the refractive index of the polymer 31 and the refractive index of the liquid crystal molecules 32 mismatch (or where the liquid crystal molecules 32 are driven by an electric field) when voltage is applied to the liquid crystal layer LC. Or, the scattered area can as well be defined as the electrode area where the respective pixel electrode PE and the common electrode CE overlap in plan view.

In each of FIGS. 5B, 6B and 7B, the horizontal axis indicates the distance along the second direction Y from the light-emitting element LD, and the vertical axis indicates the luminance of each pixel PX.

A pixel closer to the light emitting element LD, as described below, corresponds to the pixel PX1 in FIG. 4, and a pixel farther away from the light emitting element LD corresponds to the pixel PX2 in FIG. 4.

FIGS. 5A and 5B are each a diagram illustrating the luminance distribution of a comparative example.

As shown in FIG. 5A, in the comparative example, the scattered area of each pixel is constant regardless of the distance from the light emitting element LD. The light traveling inside the display panel PNL attenuates as the distance is farther away from the light emitting element LD. The amount of light reaching the pixel PX1, which is closer to the light emitting element LD, is greater than the amount of light reaching the pixel PX2, which is farther away from the light emitting element LD. Therefore, in the comparative example, the amount of light scattered at the pixel PX1 is less than the amount of light scattered at the pixel PX2. Thus, as shown in FIG. 5B, in the comparative example, the luminance decreases as the distance is farther away from the light emitting element LD.

FIGS. 6A and 6B are each a diagram illustrating the luminance distribution of the first embodiment.

As shown in FIG. 6A, in the first embodiment, the scattered area of each pixel increases as the distance is farther from the light-emitting element LD. In other words, the scattered area of the pixel PX1, which is closer to the light emitting element LD, is smaller than the scattered area of the pixel PX2, which is farther away from the light emitting element LD. Therefore, the amount of light scattered by the pixel PX1 is reduced as compared to that of the comparative example. On the other hand, the amount of light scattered by the pixel PX2 increases as compared to that of the comparative example. Therefore, the attenuation of the light traveling inside the display panel PNL is compensated. In other words, the amount of light reaching the pixel PX1 is greater but the scattered area is smaller, and therefore the luminance is lower than in the comparative example. On the other hand, the amount of light reaching the pixel PX2 is smaller but the scattered area is greater, and therefore the luminance increases as compared to that of the comparative example. Thus, in the first embodiment, as shown in FIG. 6B, the luminance can be equalized regardless of the distance from the light-emitting element LD. Or, the difference in luminance between a pixel closer to the light-emitting element LD and a pixel farther from the light-emitting element LD can be reduced. In this manner, it is possible to suppress the degradation of display quality, which may be caused by the decrease in luminance.

FIGS. 7A and 7B are each a diagram illustrating the luminance distribution of the second embodiment.

As shown in FIG. 7A, in the second embodiment, a light emitting element LD1, a display panel PNL and a light emitting element LD2 are arranged in the second direction Y in this order. The display panel PNL exhibits the maximum scattered area in a region MA of substantially a middle section along the second direction Y. In other words, the scattered area of each pixel increases as the distance is farther away from the light-emitting element LD1 towards the region MA. On the other hand, the scattered area of each pixel decreases as the distance is farther away from the region MA to the light emitting element LD2. For pixels located at an equal distance from the light emitting elements LD1 and LD2, the scattered areas thereof are substantially the same. In the second embodiment with such a configuration, the pixels close to the light emitting element LD1 and the pixels close to the light emitting element LD2 correspond to the pixel PX1 shown in FIG. 4, and the pixels in the region MA correspond to the pixel PX2 shown in FIG. 4.

The amount of light scattered at the pixel PX1 located close to light emitting element LD1 or at the pixel PX1 close to the light emitting element LD2 is reduced as compared to the amount of light scattered at the pixel PX2 in the region MA. Therefore, as in the first embodiment, the attenuation of the light traveling inside the display panel PNL is compensated. Thus, in the second embodiment, as shown in FIG. 7B, the luminance can be equalized regardless of the distance from the light emitting element LD. Therefore, it is possible to suppress the degradation of display quality, which may be caused by the decrease in luminance.

Various configuration examples will be provided below. The first to fourth configuration examples correspond to the configuration examples of the first embodiment, and the fifth configuration example corresponds to the configuration example of the second embodiment.

First Configuration Example

Figure 8:
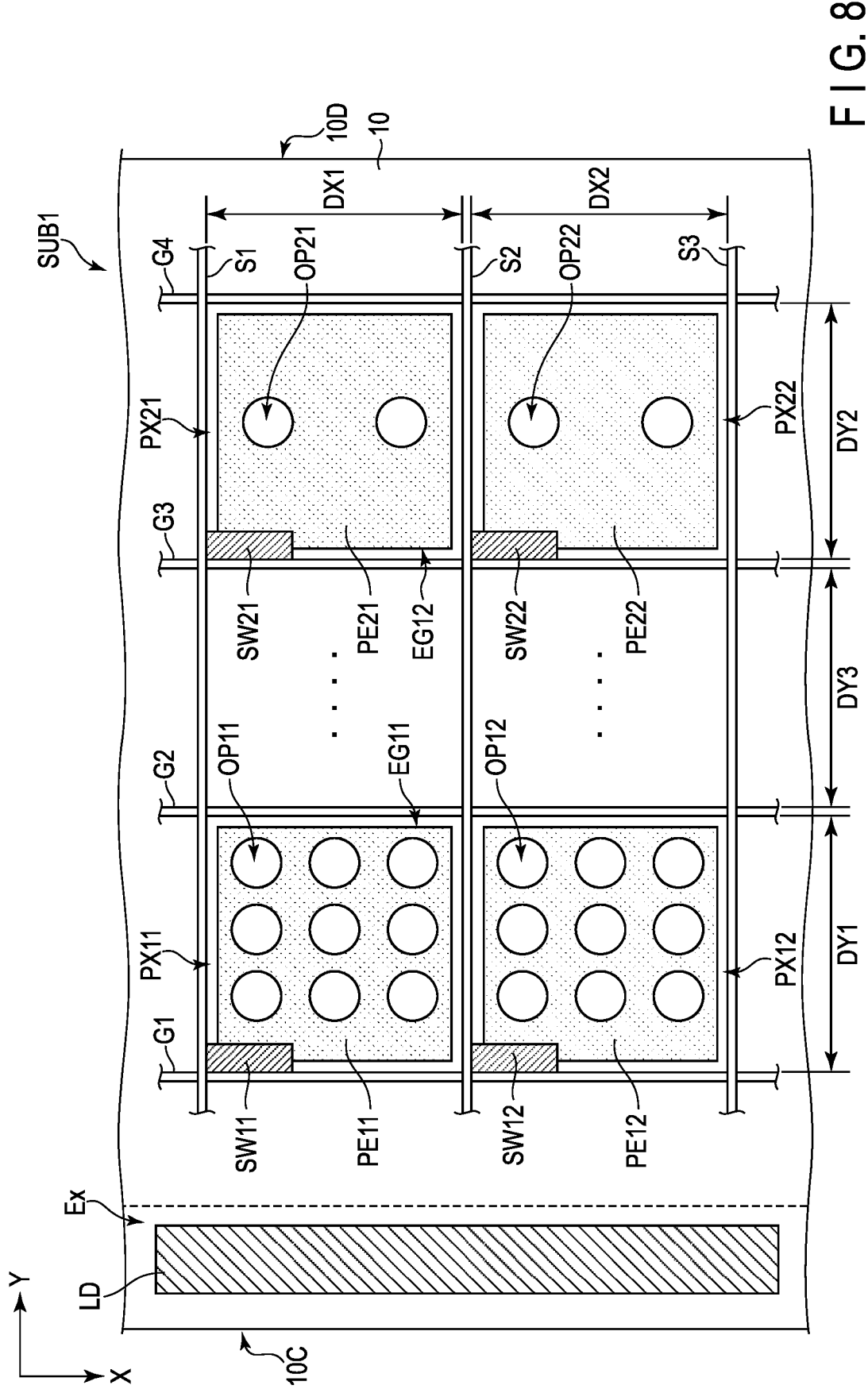
FIG. 8 is a plan view showing an example of a first substrate SUB1.

FIG. 8 is a plan view showing an example of the first substrate SUB1. In the first substrate SUB1, the scanning lines G1 to G4 each extend in the first direction X and are arranged in the second direction Y. The scanning lines G1 and G2 are adjacent to each other in the second direction Y, and the scanning lines G3 and G4 are also adjacent to each other in the second direction Y. Note that, between the scanning lines G2 and G3, a plurality of scanning lines (or pixels), not shown in the figure, are disposed. An interval DY1 between the scanning lines G1 and G2 along the second direction Y is equivalent to an interval DY2 between the scanning lines G3 and G4 along the second direction Y. An interval DY3 between the scanning lines G2 and G3 along the second direction Y is greater than the interval DY1.

The signal lines S1 and S3 each extend in the second direction Y and are arranged in the first direction X. The signal lines S1 to S3 intersect the scanning lines G1 to G4.

The signal lines S1 and S2 are adjacent to each other in the first direction X, and the signal lines S2 and S3 are also adjacent to each other in the first direction X. An interval DX1 between the signal lines S1 and S2 along the first direction X is equivalent to the interval DX2 between the signal lines S2 and S3 along the first direction X.

The pixel PX11 corresponds to the area surrounded by the scanning lines G1 and G2 and the signal lines S1 and S2. The pixel PX21 corresponds to the area surrounded by the scanning lines G3 and G4 and the signal lines S1 and S2. As mentioned above, because the interval DY1 is equivalent to the interval DY2, the area of the pixel PX11 is equivalent to the area of the pixel PX21.

The switching element SW11 is electrically connected to the scanning line G1 and the signal line S1. The pixel electrode PE11 is provided in the pixel PX11 and is electrically connected to the switching element SW11. The pixel electrode PE11 comprises openings OP11.

The switching element SW21 is electrically connected to the scanning line G3 and the signal line S1. The pixel electrode PE21 is provided in the pixel PX21 and is electrically connected to the switching element SW21. The pixel electrode PE21 comprises openings OP21.

The pixel electrode PE11 is provided between the light emitting element LD provided in the extended portion Ex and the pixel electrode PE21 in the second direction Y. Or, the transparent substrate 10 comprises a side surface 10D on an opposite side to the side surface 10C, and the pixel electrode PE21 is provided between the pixel electrode PE11 and the side surface 10D.

The electrode area of the pixel electrode PE11 is smaller than the electrode area of the pixel electrode PE21. The electrode area of the pixel electrode PE11 is the area of the electrode body excluding the openings OP11, and the electrode area of the pixel electrode PE21 is the area of the electrode body excluding the openings OP21. The total area of the openings OP11 is greater than the total area of the openings OP21.

The full length of an outer circumferential edge EG11 of the pixel electrode PE11 is equivalent to the full length of the outer circumferential edge EG21 of the pixel electrode PE21. In other words, the external shape of the pixel electrode PE11 is similar to that of the pixel electrode PE21.

The shapes of the openings OP11 and OP21 are not limited to the circular shape shown in the example in FIG. 8, but may be other shapes such as oval or polygonal.

As to the area of each of the openings OP11 and OP21 per one opening, in the example shown in FIG. 8, the area of the opening OP11 is equivalent to the area of the opening OP21, but the area of the opening OP11 may be greater than the area of the opening OP21, or the area of the opening OP11 may be smaller than the area of the opening OP21.

As to the number of the openings OP11 and OP21, in the example shown in FIG. 8, the number of the openings OP11 (nine) is greater than that of the openings OP21 (two), but the embodiment is not limited to this example. When the area of the opening OP11 is greater than the area of the opening OP21, the number of the openings OP11 may be less than that of the openings OP21, or the number of the openings OP11 may be equal to that of the openings OP21.

In the first substrate SUB1 with such a configuration, the electrode areas of those of the pixel electrodes which are arranged in the first direction X are equivalent to each other, and the total areas of the openings of those are also equivalent to each other.

For example, the pixel electrode PE11 provided in the pixel PX11 and the pixel electrode PE12 provided in the pixel PX12 are arranged in the first direction X. The electrode area of the pixel electrode PE12 is equivalent to the electrode area of the pixel electrode PE11. Further, the total area of the openings OP12 of the pixel electrode PE12 is equivalent to the total area of the openings OP11 of the pixel electrode PE11. In the example illustrated in FIG. 8, the shape of the openings OP12 is similar to the shape of the openings OP11, the area of the opening OP12 is equivalent to the area of the opening OP11, and the number of the openings OP12 is equal to the number of the openings OP11. Note that the pixel electrode PE12 is electrically connected to the switching element SW12, and the switching element SW12 is electrically connected to the scanning line G1 and the signal line S2.

Similarly, the pixel electrode PE21 provided in the pixel PX21 and the pixel electrode PE22 provided in the pixel PX22 are arranged in the first direction X. The electrode area of the pixel electrode PE22 is equivalent to the electrode area of the pixel electrode PE21. Further, the total area of the openings OP22 of the pixel electrode PE22 is equivalent to the total area of the openings OP21 of the pixel electrode PE21. The pixel electrode PE22 is electrically connected to the switching element SW22, and the switching element SW22 is electrically connected to the scanning line G3 and the signal line S2.

Figure 9:
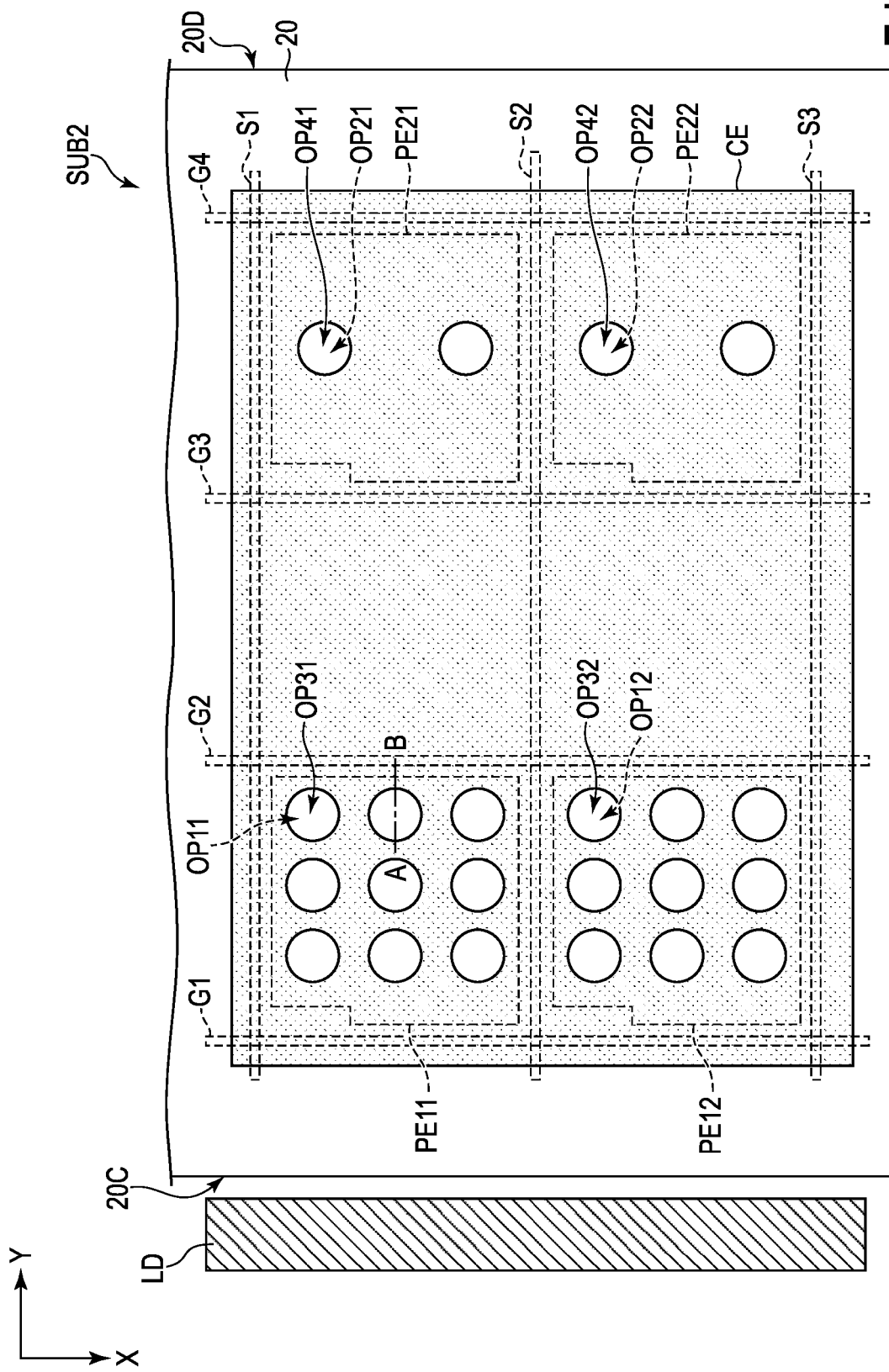
FIG. 9 is a plan view showing an example of a second substrate SUB2 overlapping the first substrate SUB1 shown in FIG. 8.

FIG. 9 is a plan view showing an example of the second substrate SUB2 overlapping the first substrate SUB1 shown in FIG. 8. The scanning lines G1 to G4, the signal lines S1 to S3 and the pixel electrodes PE11, PE12, PE21 and PE22 are illustrated by dotted lines.

In the second substrate SUB2, the transparent substrate 20 has a side surface 20D on an opposite side to the side surface 20C. The side surface 20C opposes the light emitting element LD in the second direction Y as described above. The common electrode CE overlaps the scanning lines G1 to G4, the signal lines S1 to S3 and the pixel electrodes PE11, PE12, PE21 and PE22.

The common electrode CE comprises openings OP31 overlapping the openings OP11, respectively, and openings OP41 overlapping the openings OP21, respectively. The total area of the openings OP31 is greater than the total area of the openings OP41.

The total area of the openings OP31 is equivalent to the total area of the openings OP11. The shape of the openings OP31 is similar to the shape of the openings OP11, the area of each opening OP31 is equivalent to the area of the respective opening OP11, and the number of the openings OP31 is equal to the number of the openings OP11. Here, it is assumed that there is no misalignment when bonding the first substrate SUB1 and the second substrate SUB2 together. Then, the electrode body of the pixel electrode PE11 overlaps the electrode body of the common electrode CE, and the openings OP31 do not overlap the electrode body of the pixel electrode PE11. Further, the openings OP11 do not overlap the electrode body of the common electrode CE. Similarly, the total area of the openings OP41 is equivalent to the total area of the openings OP21.

In the second substrate SUB2 with such a configuration, the total areas of the openings overlapping those of the pixel electrodes which are arranged in the first direction X are equivalent to each other.

For example, the total area of the openings OP32 overlapping the pixel electrode PE12 is equivalent to the total area of the openings OP31 overlapping the pixel electrode PE11. Note that the openings OP32 overlap the openings OP12, respectively. Similarly, the total area of the openings OP42 overlapping the pixel electrode PE22 is equivalent to the total area of the openings OP41 overlapping the pixel electrode PE21. Note that the openings OP42 overlap the openings OP22, respectively.

According to this first configuration example as described above, the electrode area of the pixel electrode PE11 is smaller than that of the pixel electrode PE21. In other words, the area of the region where voltage can be applied to the liquid crystal layer LC in the pixel PX11 (or the area of the region where the liquid crystal molecules are driven) is smaller than the area of the region where voltage can be applied to the liquid crystal layer LC in the pixel PX21. Therefore, the scattered area in the pixel PX11 is smaller than the scattered area in the pixel PX21. Thus, as described with reference to FIGS. 6A and 6B, the uniformity in luminance can be achieved. Or, the difference in luminance between the pixel PX11 and the pixel PX21 can be reduced.

Moreover, since both the pixel electrode PE and the common electrode CE are made with openings, the total area of the transparent electrodes can be reduced. With this configuration, even if the transparent electrodes have light absorbing property, the light absorption in the transparent electrodes can be suppressed as compared to the case where the transparent electrodes do not comprise openings.

Second Configuration Example

Figure 10:
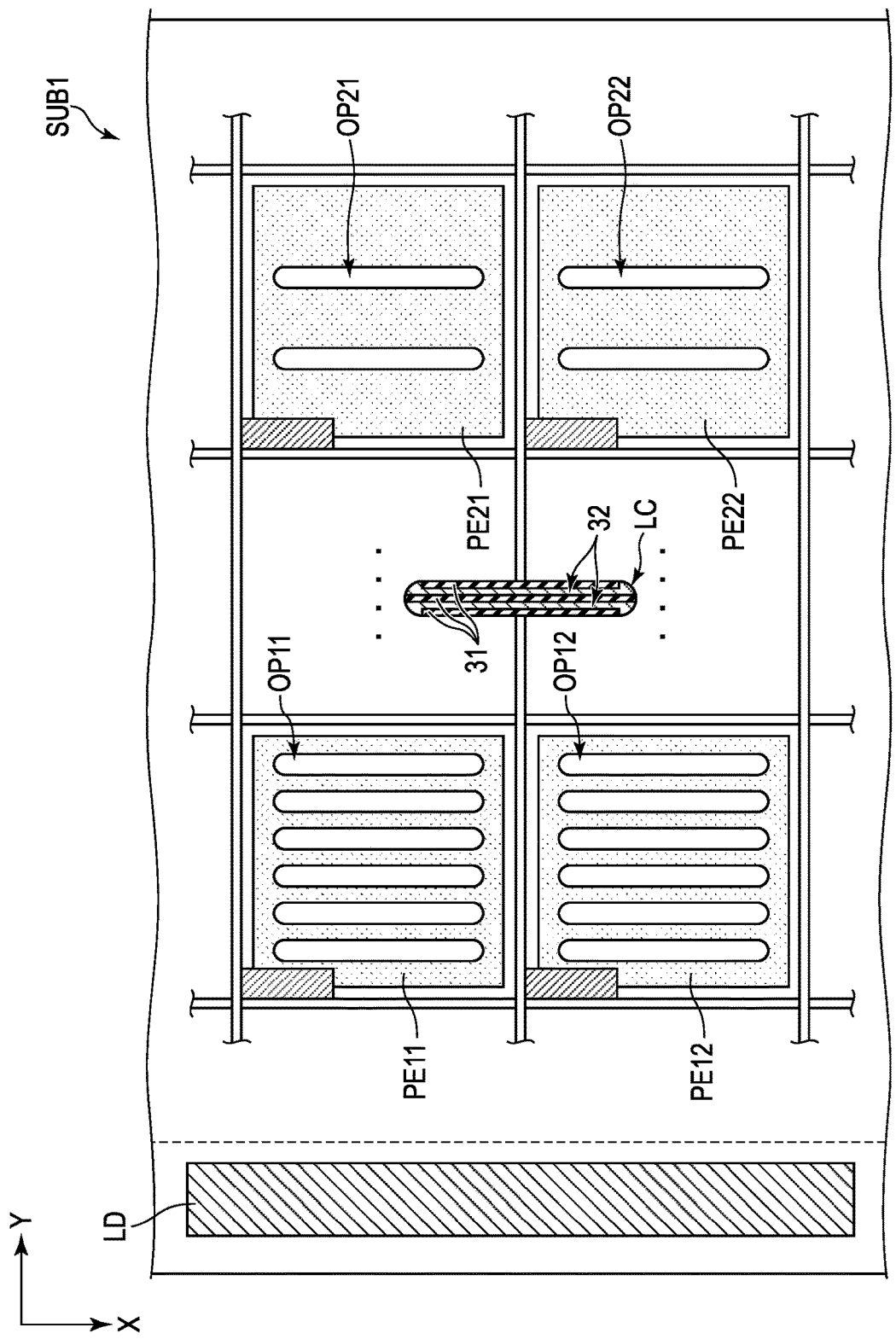
FIG. 10 is a plan view showing an example of the first substrate SUB1.

FIG. 10 is a plan view showing an example of the first substrate SUB1. The second configuration example is different from the first configuration example provided above in that the openings OP11, OP12, OP21, and OP22 all extend along the same direction. In the example illustrated in FIG. 10, the openings OP11, OP12, OP21 and OP22 all extend along the first direction X. The extending direction of the openings OP11, OP12, OP21 and OP22 is substantially parallel to the extending direction of the polymer 31 in the liquid crystal layer LC. In other words, the polymer 31 is formed into a strip form extending along the first direction X, as described with reference to FIG. 1.

Figure 11:
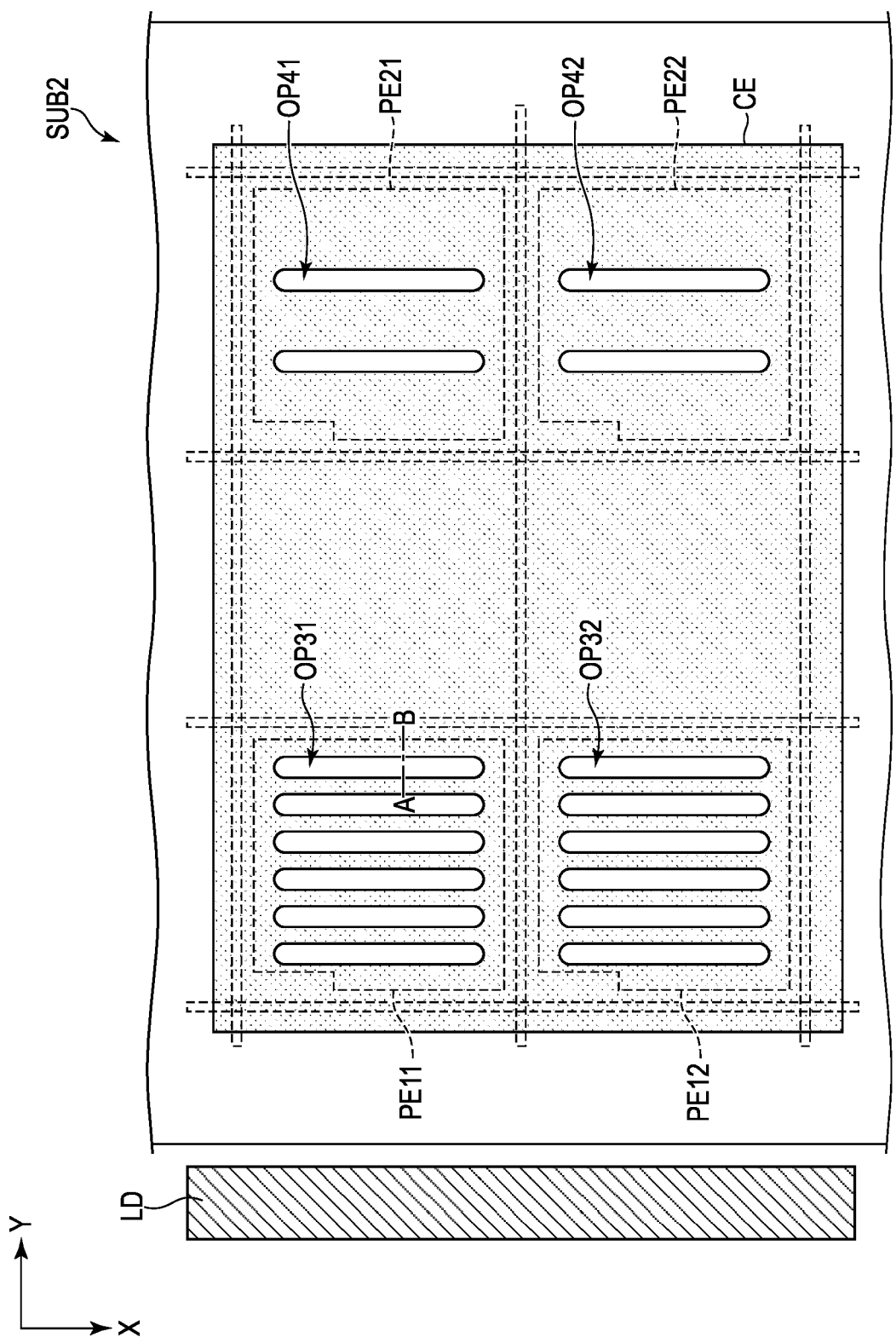
FIG. 11 is a plan view showing an example of a second substrate SUB2 overlapping the first substrate SUB1 shown in FIG. 10.

FIG. 11 is a plan view showing an example of the second substrate SUB2 overlapping the first substrate SUB1 shown in FIG. 10. The openings OP31, OP32, OP41 and OP42 all extend along the first direction X. Further, as in the first configuration example, the openings OP31 overlap the openings OP11, respectively, the openings OP32 overlap the openings OP12, respectively, the openings OP41 overlap the openings OP21, respectively, and the openings OP42 overlap the openings OP22, respectively.

In the second configuration example, advantageous effects similar to those of the first configuration example can be obtained. In addition, since the openings OP of each of the pixel electrode PE and the common electrode CE extend along the first direction X, it is possible to suppress an undesired electric field from being formed. In other words, the liquid crystal molecules 32 are initially aligned along the first direction X. In a portion of the edge of each opening OP, which extends along the direction intersecting the first direction X, an electric field that promotes the driving of the liquid crystal molecules 32 is easily formed. In the region where such an electric field is formed, the liquid crystal molecules 32 are driven to form an undesired scattered state. Originally, in the pixels PX close to the light emitting element LD, even though a large number of openings OP are formed to reduce the scattered area, the larger the number of openings OP, the more the area which causes undesired scattering is increased. In the second configuration example, the openings OP extend along the first direction X, and therefore the area that causes the undesired scattering can be reduced. Thus, the electrode area and the scattered area substantially coincide with each other.

Cross Section of Opening

Figure 12:
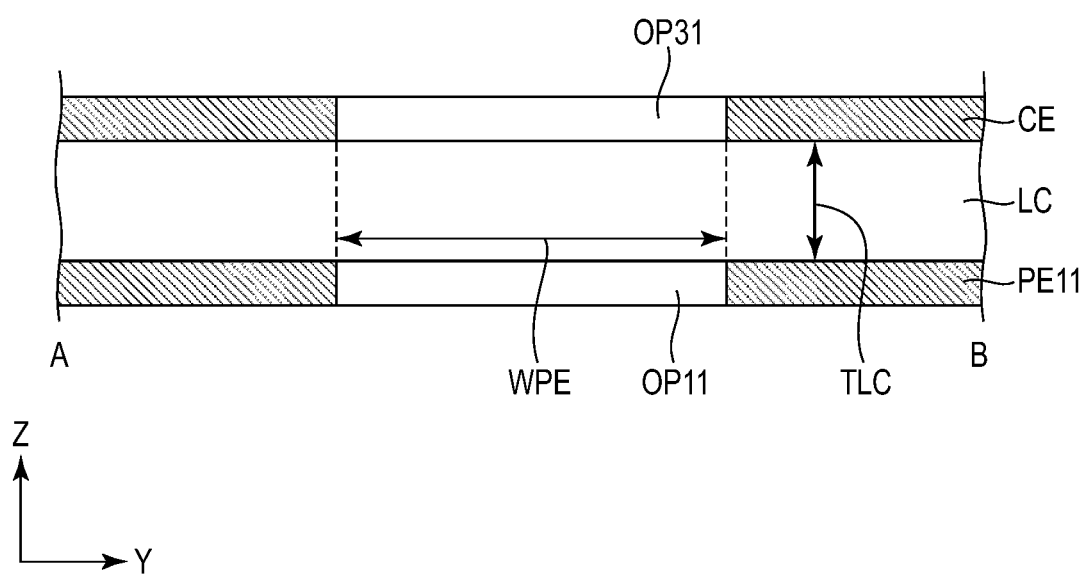
FIG. 12 is a cross-sectional view taken along line A-B shown in FIGS. 9 and 11.

FIG. 12 is a cross-sectional view taken along line A-B shown in FIGS. 9 and 11. Here, only the pixel electrode PE11 including an opening OP11, the common electrode CE including an opening OP31, and the liquid crystal layer LC are illustrated.

The opening OP31 is located directly above the opening OP11. The liquid crystal layer LC has a thickness TLC along the third direction Z between the pixel electrode PE11 and the common electrode CE. In the pixel electrode PE11, a width WPE of the opening OP11 along the second direction Y is greater than the thickness TLC. Note that the width of the opening OP31 along the second direction Y is equivalent to the width WPE. The openings OP11 and OP31 in the first configuration example shown in FIG. 9 are circular, and the width WPE corresponds to the diameters of the openings OP11 and OP31. The openings OP11 and OP31 of the second configuration example shown in FIG. 11 extend along the first direction X, and the width WPE corresponds to the length of the openings OP11 and OP31 along the direction (the second direction Y) perpendicular to the extending direction (the first direction X).

The width WPE is greater than the thickness TLC, and therefore undesired electric fields such as inclined electric fields and lateral electric fields are not easily formed in the openings OP11 and OP31, and thus the undesired scattering in the liquid crystal layer LC can be suppressed. Note that it is also preferable for the other openings that the width be greater than the thickness TLC.

Capacitive Electrode Shape

Figure 13:
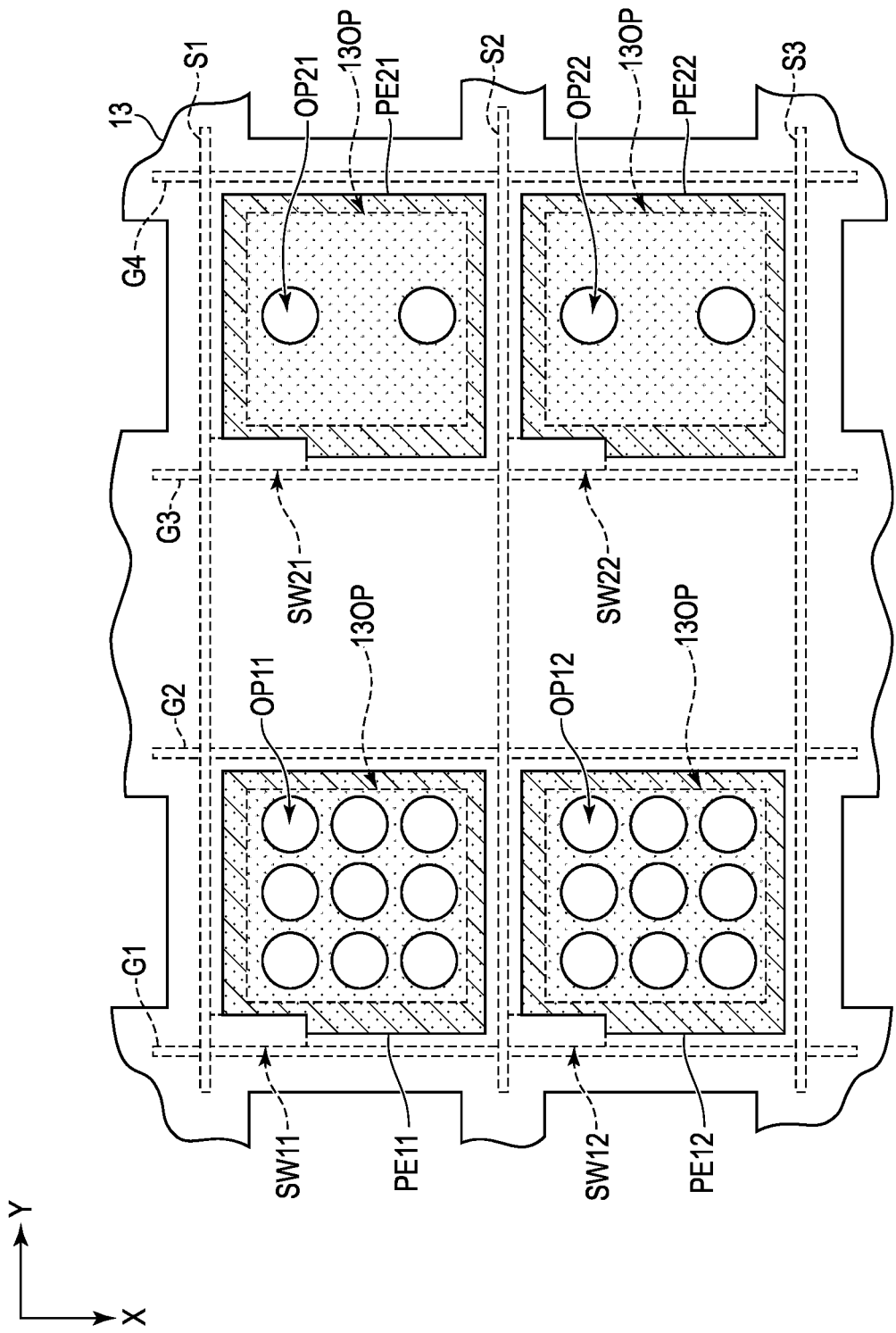
FIG. 13 is a plan view showing an example of a capacitive electrode 13.

FIG. 13 is a plan view showing an example of the capacitive electrode 13. For example, the capacitive electrode 13 overlaps the scanning lines G1 to G4, the signal lines S1 to S3, and the switching elements SW11, SW12, SW21 and SW22, and is formed into a grid pattern. More specifically, the capacitive electrode 13 comprises a nearly rectangular-shaped opening 130P in each pixel. The capacitive electrode 13 overlap the pixel electrodes PE11, PE12, PE21 and PE22 to form a capacitance in each pixel, as shown by hatched lines in FIG. 13. Note that the capacitive electrode 13 does not overlap the openings OP11, OP12, OP21 and OP22 in each pixel electrode PE. Or, the openings OP of each pixel electrode PE overlap the opening 130P of the capacitive electrode 13. The overlapping area between the pixel electrode PE11 and the capacitive electrode 13 is equivalent to the overlapping area between the pixel electrode PE21 and the capacitive electrode 13. Further, the overlapping area between the pixel electrode PE11 and the capacitive electrode 13 is equivalent to the overlapping area between the pixel electrode PE12 and the capacitive electrode 13. The overlapping area between the pixel electrode PE21 and the capacitive electrode 13 is equivalent to the overlapping area between the pixel electrode PE22 and the capacitive electrode 13. That is, regardless of the distance from the light-emitting element, the capacitances of the pixels can be made equivalent to each other. Moreover, the opening OP of each pixel electrode PE does not overlap the capacitance electrode 13, and thus the fringe electric field, which is undesired, can suppress from being formed.

In the above-provided first and second configuration examples, the case where the openings of the common electrode CE overlap the openings of the pixel electrodes PE is discussed, but the examples are not limited to this case. For example, the common electrode CE may not comprise an opening, and the pixel electrode PE may comprise an opening. Or, the common electrode CE may comprise an opening while the pixel electrode PE may not comprise an opening. Even in these cases, the pixel electrode PE or the common electrode CE comprises an opening, and therefore the electric field near the opening is weakened as compared to the case where either one of the pixel electrode PE and the common electrode CE does not comprise an opening. With this structure, the scattered state is not easily formed near the openings, and therefore the scattered area can be substantially reduced. Thus, it becomes possible to create a luminance distribution similar to that of the case where both the pixel electrode PE and the common electrode CE comprise openings.

Third Configuration Example

Figure 14:
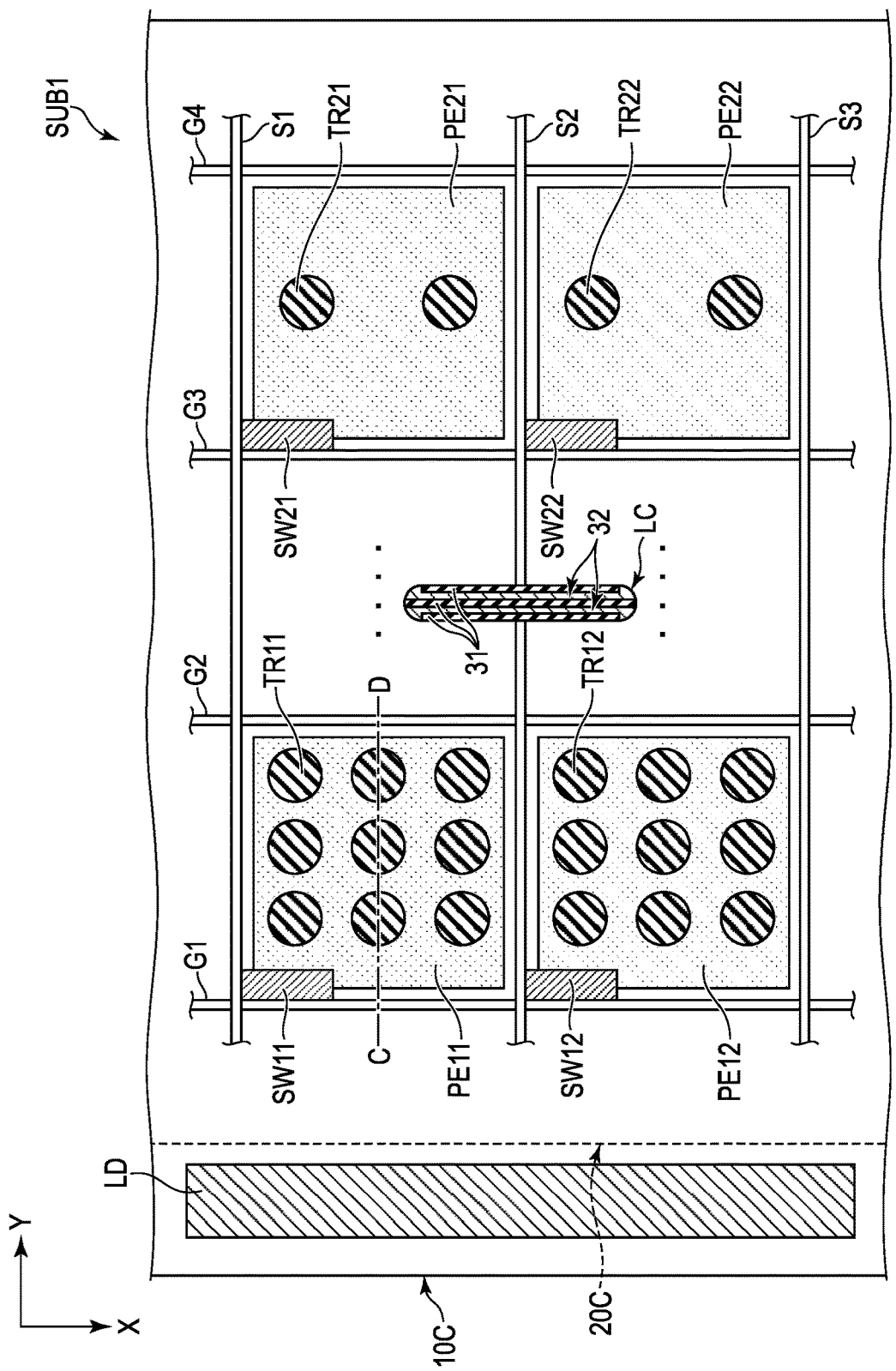
FIG. 14 is a plan view showing an example of the first substrate SUB1.

FIG. 14 is a plan view showing an example of the first substrate SUB1. The third configuration example is different from the first configuration example in that each pixel electrode PE is formed in a flat plate shape without an opening, and the transparent resins TR overlaps each pixel electrode PE. Note that the common electrode, which is not shown in the figure, is also formed into a flat plate shape without openings.

The pixel electrode PE11 is provided between the light-emitting element LD and the pixel electrode PE21 in the second direction Y. The electrode area of the pixel electrode PE11 is equivalent to the electrode area of the pixel electrode PE21.

The transparent resins TR11 overlap the pixel electrode PE11, the transparent resins TR12 overlap the pixel electrode PE12, the transparent resins TR21 overlap the pixel electrode PE21, and the transparent resins TR22 overlap the pixel electrode PE22. The transparent resins TR are formed of a material different from those of the polymer 31 and the liquid crystal molecules 32 of the liquid crystal layer LC. For example, the transparent resins TR are formed of a material having a transparency higher than that of the polymer 31. Further, the transparent resins TR, unlike the polymer 31, do not have an anisotropic refractive index. Note that the refractive index of the transparent resin TR is different from the extraordinary ray refractive index ne of the polymer 31, and is equivalent to the ordinary ray refractive index no of the polymer 31, which is about 1.5.

The overlapping area between the pixel electrode PE11 and the transparent resins TR11 is greater than the overlapping area between the pixel electrode PE21 and the transparent resins TR21. Note that the overlapping area between the pixel electrode PE11 and the transparent resins TR11 is equivalent to the overlapping area of the pixel electrode PE12 and the transparent resins TR12. Further, the overlapping area between the pixel electrode PE21 and the transparent resins TR21 is equivalent to the overlapping area between the pixel electrode PE22 and the transparent resins TR22.

The shape of the transparent resin TR in plan view is not limited to circular in the example shown in FIG. 14, but may be some other shape such as oval or polygonal. Further, as explained in the second configuration example, the transparent resin TR may extend along the first direction X.

As to the area of each of the transparent resins TR per one transparent resin in plan view, in the example shown in FIG. 14, all the transparent resins are equivalent to each other, but may be different from each other.

The number of transparent resins TR overlapping each pixel electrode PE is not limited to that of the example shown in FIG. 14.

FIGS. 15A and 15B are each a cross-sectional view taken along line C-D shown in FIG. 14. Here, only the pixel electrode PE11, the alignment film AL1, the common electrode CE, the alignment film AL2, the transparent resins TR11 and the liquid crystal layer LC are shown. The example shown in FIGS. 15A and 15B corresponds to an example in which the transparent resins TR11 are provided on the second substrate SUB2. The transparent resins TR11 are each formed into a columnar shape. Note that the transparent resins TR11 are illustrated here for description, but the transparent resins TR21 and the like are also formed in a similar manner to that of the transparent resins TR11.

In FIG. 15A, the transparent resins TR11 are in contact with the common electrode CE and the alignment film AL2, and are separated from the alignment film AL1 (or the first substrate SUB1). In other words, the liquid crystal layer LC is interposed between the alignment film AL1 and the transparent resins TR11. Here, a thickness TTR of the transparent resins TR11 along the third direction Z should be ½ or more of a thickness TLC of the liquid crystal layer LC. The transparent resins TR11 come into contact with the alignment film AL1 when an impact such as pressing is applied in the third direction Z. Thus, it is possible to suppress excessive deformation of the display panel PNL.

In FIG. 15B, the transparent resins TR11 are in contact with the common electrode CE and the alignment film AL2, and also in contact with the alignment film AL1 (or the first substrate SUB1). In other words, the transparent resins TR11 function as a spacer that forms a cell gap between the alignment film AL1 and the alignment film AL2.

Figure 16A:
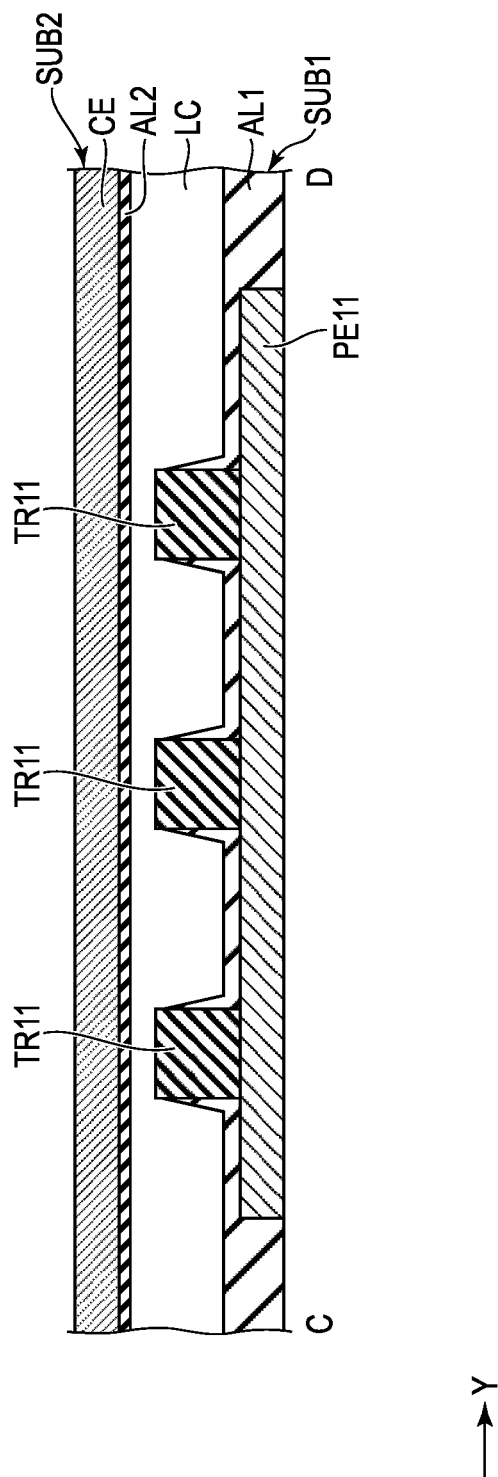
FIG. 16A is another cross-sectional view taken along line C-D shown in FIG. 14.
Figure 16B:
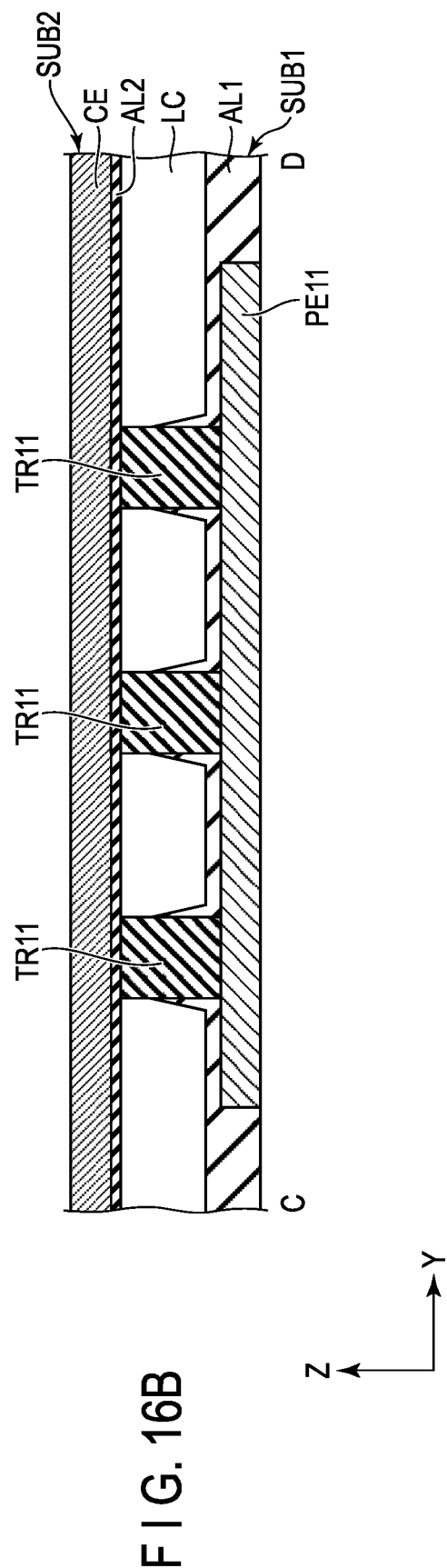
FIG. 16B is another cross-sectional view taken along line C-D shown in FIG. 14.

FIGS. 16A and 16B are each another cross-sectional view taken along line C-D shown in FIG. 14. The example shown in FIGS. 16A and 16B is different from that shown in FIGS. 15A and 15B in that the transparent resins TR11 are provided on the first substrate SUB1. In FIG. 16A, the transparent resins TR11 are in contact with the pixel electrode PE11 and the alignment film AL1, and are separated from the alignment film AL2 (or the second substrate SUB2). In other words, the liquid crystal layer LC is interposed between the transparent resins TR11 and the alignment film AL2. In FIG. 16B, the transparent resins TR11 are in contact with the pixel electrode PE11 and the alignment film AL1, and also in contact with the alignment film AL2 (or the second substrate SUB2). In other words, the transparent resins TR11 function as a spacer to form a cell gap between the alignment film AL1 and the alignment film AL2.

According to this third configuration example, the overlapping area between the pixel electrode PE11 and the transparent resins TR11 is greater than the overlapping area between the pixel electrode PE21 and the transparent resins TR21. The area where the transparent resins TR are present does not contain the polymer 31 and the liquid crystal molecules 32, and therefore it does not contribute to scattering. That is, the scattered area at the pixel PX11 is smaller than the scattered area at the pixel PX21. Therefore, as explained with reference to FIGS. 6A and 6B, the uniformity in luminance can be achieved.

Note that the first, second and third configuration examples provided above can be combined as appropriate.

Fourth Configuration Example

FIG. 17 is a diagram illustrating the distribution of the scattered area in the fourth configuration example. The display panel PNL comprises a plurality of display blocks B1 to B4 arranged in the second direction Y. Each of the display blocks B1 to B4 is configured so that the scattered area of each pixel increases as the distance is farther away from the light emitting element LD, as explained with reference to FIG. 6A. For this reason, in each of the display blocks B1 to B4, the amount of light scattered by pixels close to the light emitting element LD is reduced, whereas the amount of light scattered by pixels farther from the light emitting element LD is increased. Thus, the uniformity in luminance can be achieved in each of the display blocks B1 to B4.

The number of display blocks in the display panel PNL is not limited to that of the example shown in FIG. 17. The length of each of the display blocks B1 to B4 along the second direction Y can be set arbitrarily. For example, the display block B2 located in the center of the display panel PNL may be expanded to be longer than the display block B1 along the second direction Y. The minimum scattered areas of the display blocks B1 to B4 may all be the same as or different from each other. Further, the maximum scattered areas of the display blocks B1 to B4 may all be the same or different.

Figure 18:
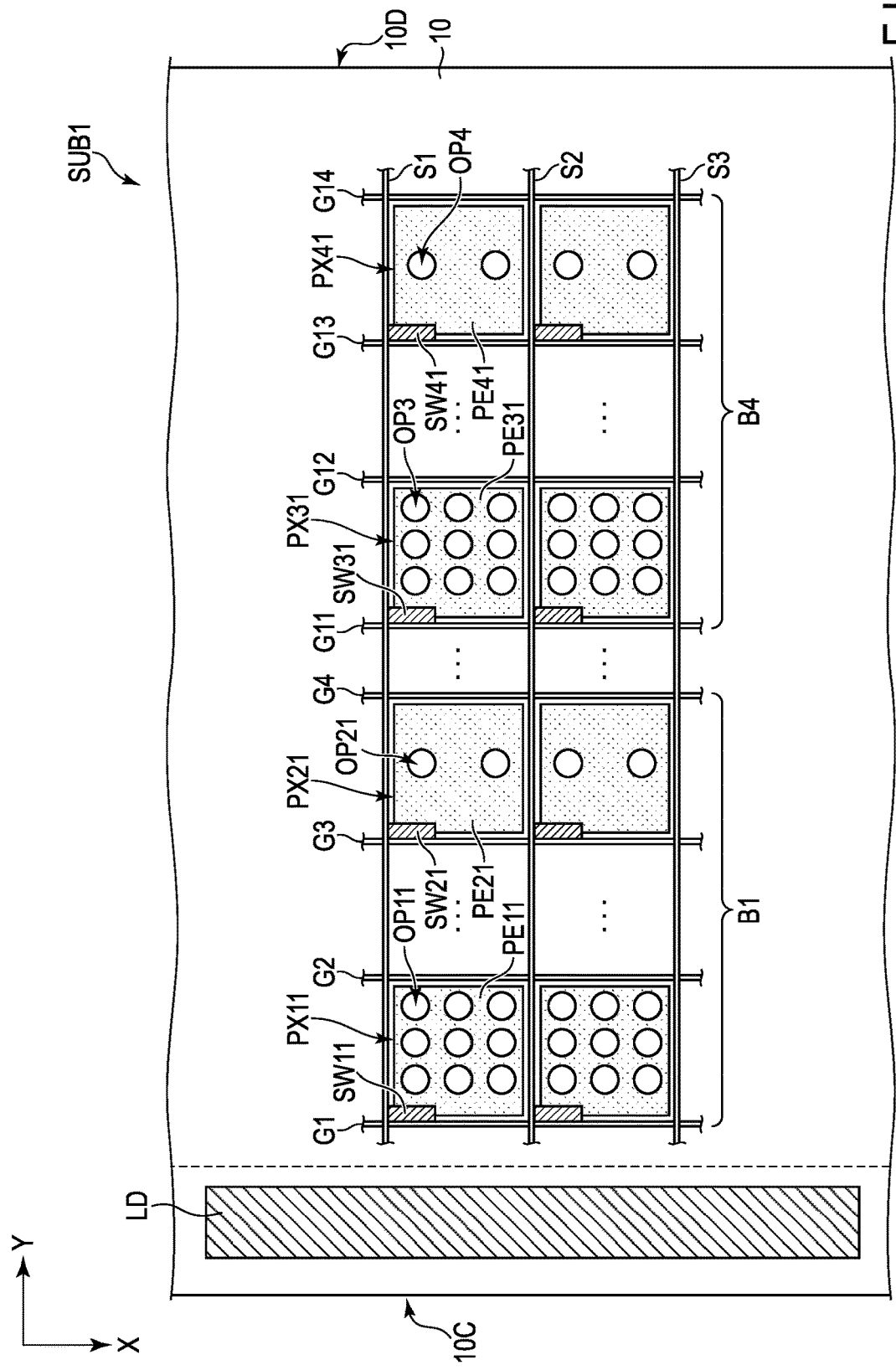
FIG. 18 is a plan view of an example of the first substrate SUB1.

FIG. 18 is a plan view showing an example of the first substrate SUB1. In the example shown in FIG. 18, each pixel electrode PE comprises openings OP, and the distribution of the scattered area is created by the electrode areas of the pixel electrodes PE.

In the first substrate SUB1, the display block B1 close to the light emitting element LD is similar to that of the first configuration example shown in FIG. 8. The display block B4 close to the side surface 10D is also configured in a similar manner to that of the display block B1. In briefly description of the display block B4, the switching element SW31 is electrically connected to the scanning line G11 and the signal line S1. The pixel electrode PE31 is provided in the pixel PX31 and is electrically connected to the switching element SW31. The pixel electrode PE31 comprises openings OP3. The switching element SW41 is electrically connected to the scanning line G13 and the signal line S1. The pixel electrode PE41 is provided in the pixel PX41 and is electrically connected to the switching element SW41. The pixel electrode PE41 comprises openings OP4. The area of the pixel PX31 is equivalent to the area of the pixel PX41. The area of the pixel PX31 is also equivalent to the area of the pixel PX11 and the area of the pixel PX21.

The pixel electrode PE31 is provided between the pixel electrode PE21 and the pixel electrode PE41 in the second direction Y. The electrode area of the pixel electrode PE31 is smaller than the electrode area of the pixel electrode PE21. The electrode area of the pixel electrode PE41 is greater than the electrode area of the pixel electrode PE31. The total area of the openings OP3 is greater than the total area of the openings OP21. The total area of the openings OP4 is smaller than the total area of the openings OP3.

Thus, the uniformity in luminance can be achieved in both of the display blocks B1 and B4.

Figure 19:
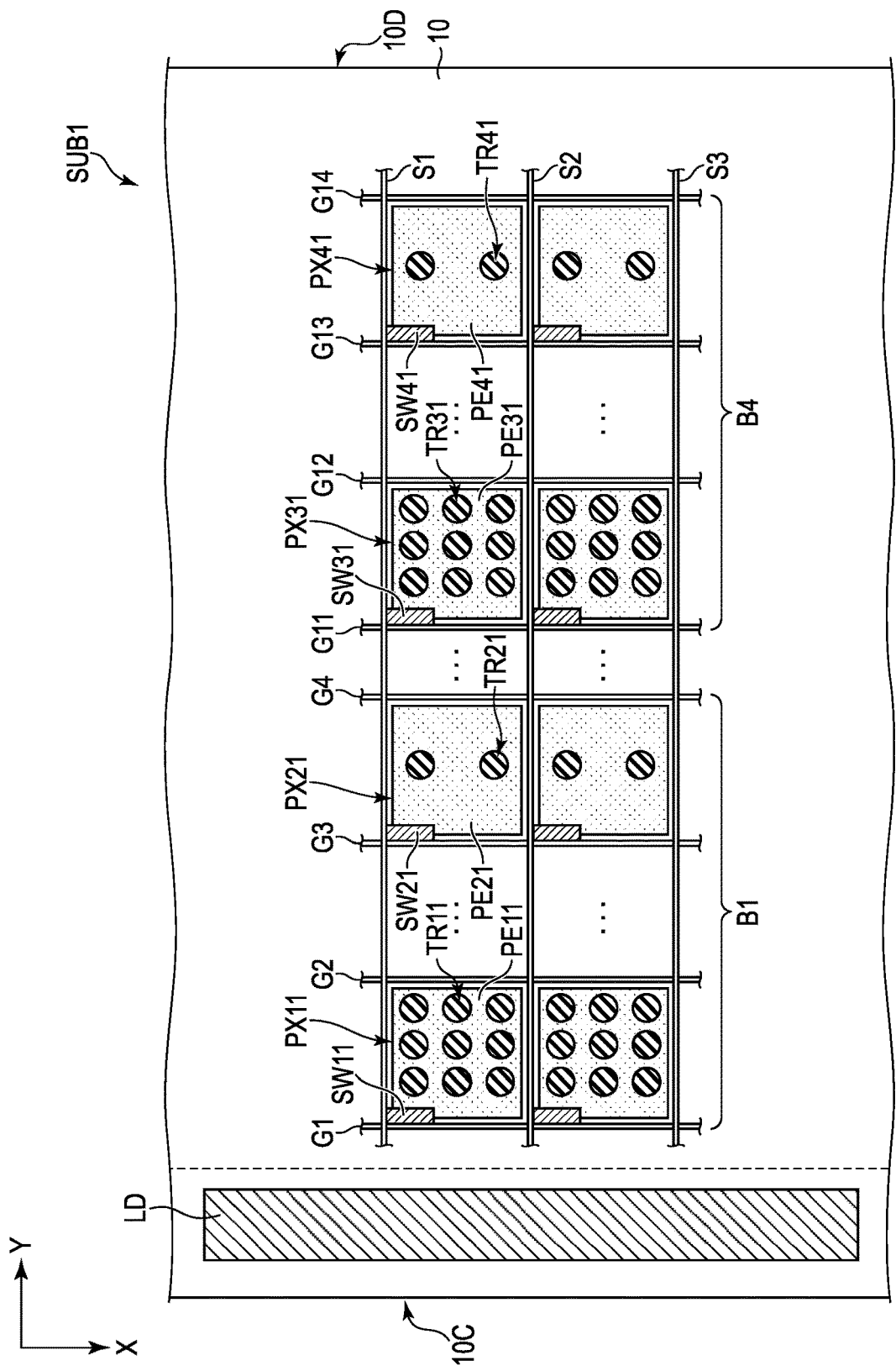
FIG. 19 is a plan view of another example of the first substrate SUB1.

FIG. 19 is a plan view showing another example of the first substrate SUB1. In the example shown in FIG. 19, the distribution of the scattered area is created by the overlapping area between the pixel electrodes PE and the respective transparent resins TR.

In the first substrate SUB1, the display block B1 is similar to that of the third configuration example shown in FIG. 14. The display block B4 as well is configured in a similar manner to that of the display block B1. In briefly description of the display block B4, the transparent resins TR31 provided in the pixel PX31 overlap the pixel electrode PE31. The transparent resins TR41 provided in the pixel PX41 overlap the pixel electrode PE41. The overlapping area between the pixel electrode PE31 and the transparent resins TR31 is greater than the overlapping area between the pixel electrode PE21 and the transparent resins TR21. The overlapping area between the pixel electrode PE41 and the transparent resins TR41 is smaller than the overlapping area between the pixel electrode PE31 and the transparent resins TR31. The total area of the transparent resins TR31 is greater than the total area of the transparent resins TR21. The total area of the transparent resins TR41 is smaller than the total area of the transparent resins TR31.

Therefore, the uniformity in luminance can be achieved in both of the display blocks B1 and B4.

Fifth Configuration Example

Figure 20:
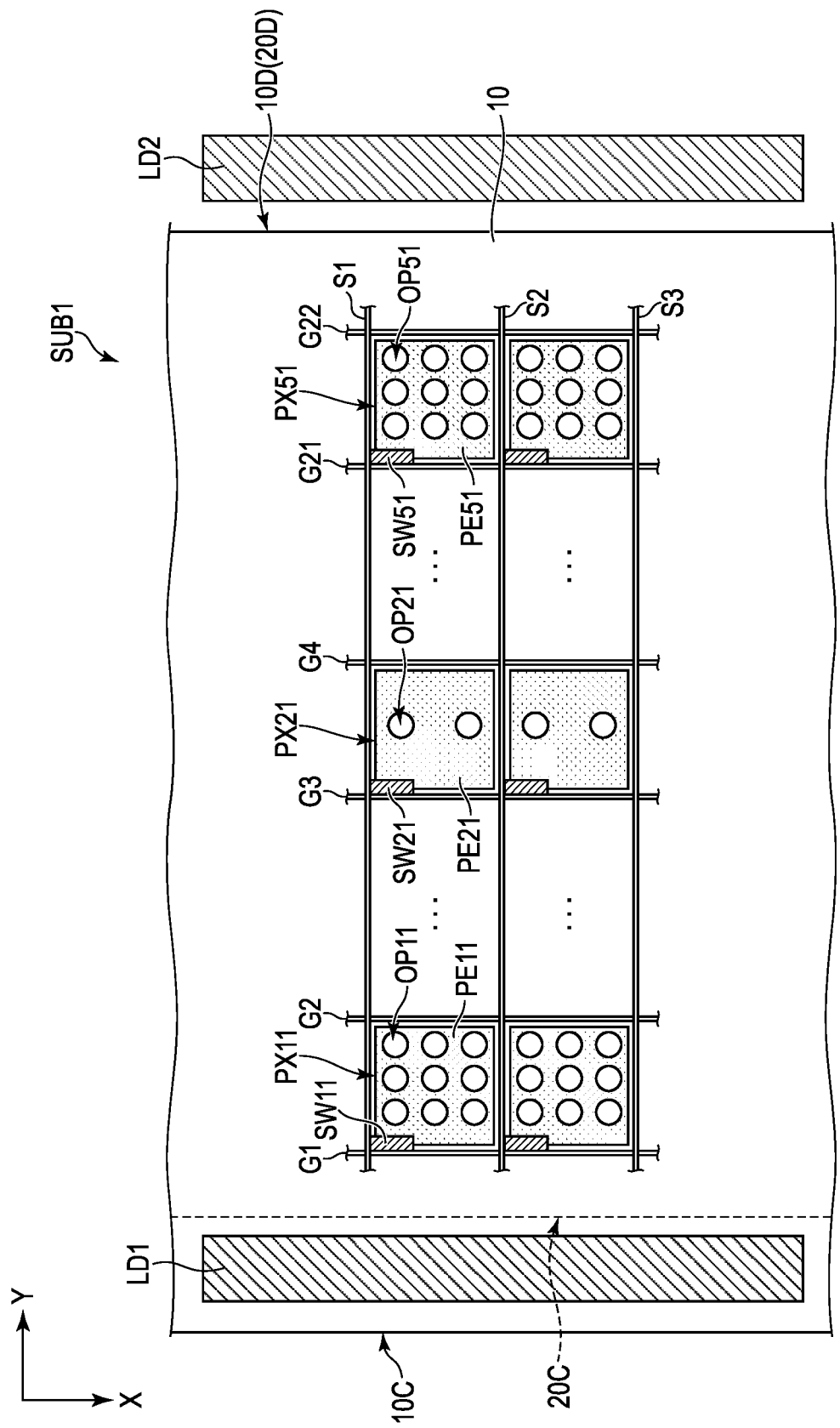
FIG. 20 is a plan view of an example of the first substrate SUB1.

FIG. 20 is a plan view showing another example of the first substrate SUB1. In the example shown in FIG. 20, each pixel electrode PE comprise openings OP, and the distribution of the scattered area is created by the electrode area of the pixel electrodes PE.

The light-emitting element LD1 opposes the side surface 20C of the transparent substrate 20, indicated by a dotted line. The light emitting element LD2 opposes the side surface 10D of the transparent substrate 10 and the side surface 20D of the transparent substrate 20.

In the first substrate SUB1, the switching element SW51 is electrically connected to the scanning line G21 and the signal line S1. The pixel electrode PE51 is provided in the pixel PX51 and is electrically connected to the switching element SW51. The pixel electrode PE51 comprises openings OP51. The area of the pixel PX51 is equivalent to the area of the pixel PX11 and the area of the pixel PX21.

The pixel PX21 is located in the region MA of the display panel PNL described with reference to FIGS. 7A and 7B. The pixel electrode PE11 is provided between the light-emitting element LD1 and the pixel electrode PE21 in the second direction Y. The pixel electrode PE51 is provided between the pixel electrode PE21 and the light-emitting element LD2 in the second direction Y. The electrode area of the pixel electrode PE21 is greater than the electrode area of the pixel electrode PE11 and the electrode area of the pixel electrode PE51. Further, the total area of the openings OP21 is smaller than the total area of the openings OP11 and also smaller than the total area of the openings OP51.

Figure 21:
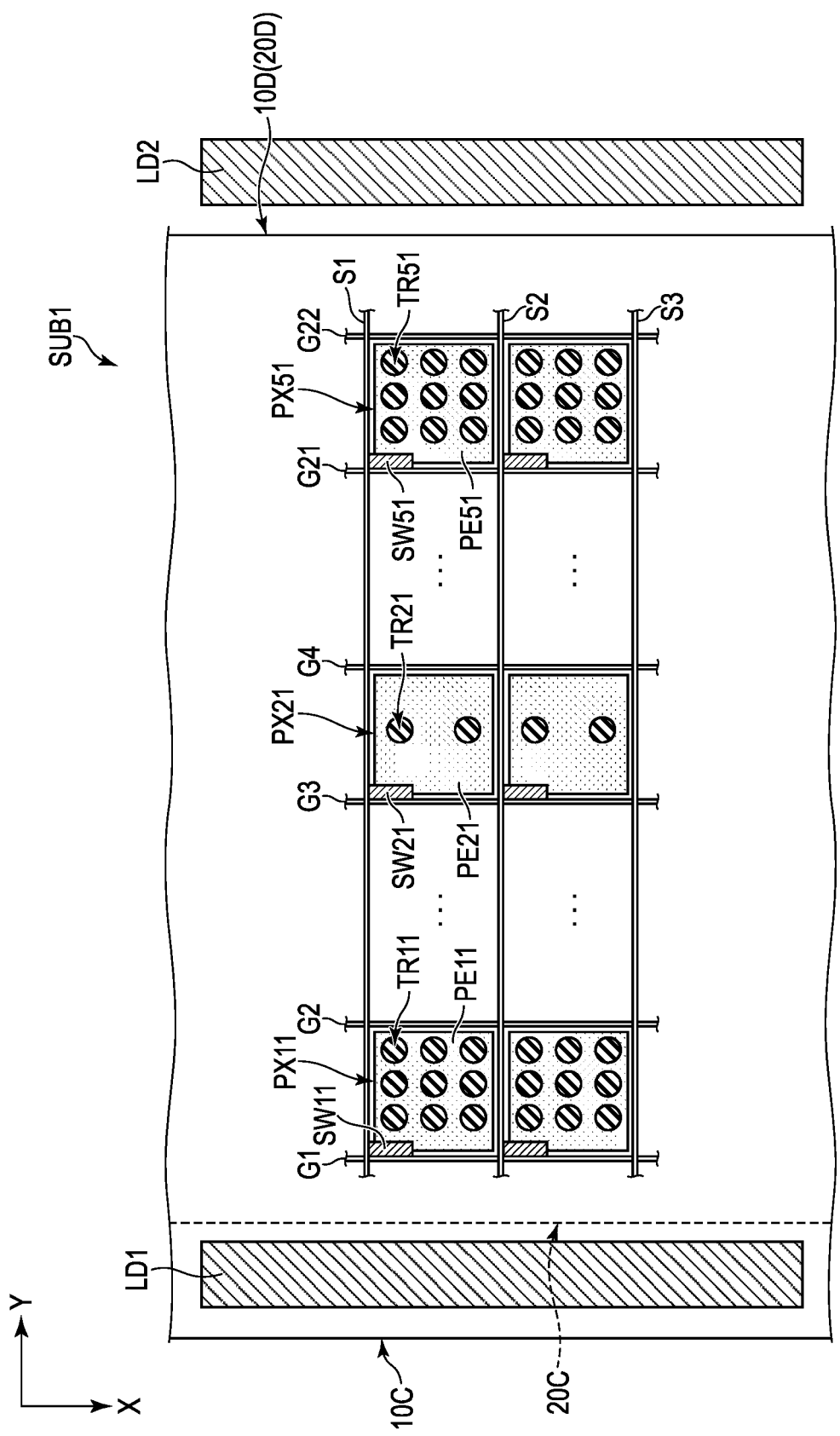
FIG. 21 is a plan view of another example of the first substrate SUB1.

FIG. 21 is a plan view showing another example of the first substrate SUB1. In the example shown in FIG. 21, the distribution of the scattered area is created by the overlapping area between each pixel electrode PE and the transparent resins TR.

In the first substrate SUB1, the transparent resins TR51 provided on the pixel PX51 overlaps the pixel electrode PE51. The overlapping area between the pixel electrode PE21 and the transparent resins TR21 is smaller than the overlapping area between the pixel electrode PE11 and the transparent resins TR11. The overlapping area between the pixel electrode PE21 and the transparent resins TR21 is smaller than the overlapping area between the pixel electrode PE51 and the transparent resins TR51. Further, the total area of the transparent resins TR21 is smaller than the total area of the transparent resins TR11 and also smaller than the total area of the transparent resins TR51.

According to the fifth configuration example, the uniformity in luminance can be achieved as explained with reference to FIGS. 7A and 7B.

In this specification, for example, the transparent substrate 10 corresponds to the first transparent substrate and the transparent substrate 20 corresponds to the second transparent substrate. The switching element SW11 corresponds to the first switching element, the switching element SW21 corresponds to the second switching element, the switching element SW31 corresponds to the third switching element, the switching element SW41 corresponds to the fourth switching element, and the switching element SW51 corresponds to the fifth Switching element SW51.

The pixel electrode PE11 corresponds to the first pixel electrode, and the openings OP11 correspond to the first openings. The pixel electrode PE21 corresponds to the second pixel electrode, and the openings OP21 correspond to the second openings. The pixel electrode PE31 corresponds to the third pixel electrode, the pixel electrode PE41 corresponds to the fourth pixel electrode, and the pixel electrode PE51 corresponds to the fifth pixel electrode. In the common electrode CE, the openings OP31 correspond to the third openings and the openings OP41 correspond to the fourth opening, respectively.

The scanning line G1 corresponds to the first scanning line, the scanning line G2 corresponds to the second scanning line, the scanning line G3 corresponds to the third scanning line, and the scanning line G4 corresponds to the fourth scanning line. The signal line S1 corresponds to the first signal line, and the signal line S2 corresponds to the second signal line. The pixel PX11 corresponds to the first pixel, and the pixel PX21 corresponds to the second pixel.

The transparent resin TR11 corresponds to the first transparent resin, the transparent resin TR21 corresponds to the second transparent resin, the transparent resin TR31 corresponds to the third transparent resin, and the transparent resin TR41 corresponds to the fourth transparent resin.

As explained above, according to the present embodiments, a display device which can suppress the degradation of display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of the display device obtained from the configuration disclosed herein will be provided as additional notes below.

(1) A display device comprising:
a light-emitting element;
a first substrate comprising a first transparent substrate, a first switching element, a second switching element, a first pixel electrode electrically connected to the first switching element, and a second pixel electrode electrically connected to the second switching element;
a second substrate comprising a second transparent substrate comprising a side surface opposing the light-emitting element, and a common electrode overlapping the first pixel electrode and the second pixel electrode; and
a liquid crystal layer provided between the first substrate and the second substrate and containing a polymer and liquid crystal molecules,
the first pixel electrode being provided between the light-emitting element and the second pixel electrode, and
an electrode area of the first pixel electrode being smaller than an electrode area of the second pixel electrode.

(2) The display device of item (1), wherein
a full length of an outer circumferential edge of the first pixel electrode is equivalent to a full length of an outer circumferential edge of the second pixel electrode.

(3) The display device of item (2), wherein
the first substrate comprises first to fourth scanning lines and first and second signal lines that intersect the first to fourth scanning lines,
the first pixel electrode is provided in a first pixel surrounded by the first and second scanning lines and the first and second signal lines,
the second pixel electrode is provided in a second pixel surrounded by the third and fourth scanning lines and the first and second signal lines, and
an interval between the first scanning line and the second scanning line is equivalent to an interval between the third scanning line and the fourth scanning line.

(4) The display device of items (1) to (3), wherein
the first pixel electrode comprises a first opening,
the second pixel electrode comprises a second opening, and
a total area of the first opening is greater than a total area of the second opening.

(5) The display device of item (4), wherein
the common electrode comprises a third opening overlapping the first opening and a fourth opening overlapping the second opening.

(6) The display device of item (4) or (5), wherein
each of the first opening and the second opening extends along a same direction, and
the polymer is formed into a strip shape extending along an extending direction of the first and second openings.

(7) The display device of item (6), wherein
each of the first opening and the second opening has a width in a direction orthogonal to the extending direction, and
the width is greater than a thickness of the liquid crystal layer.

(8) The display device of any one of items (1) to (7), wherein
the first substrate comprises a capacitive electrode overlapping the first pixel electrode and the second pixel electrode, and
an overlapping area between the first pixel electrode and the capacitive electrode is equivalent to an overlapping area between the second pixel electrode and the capacitive electrode.

(9) The display device of any one of items (1) to (7), wherein
the first substrate comprises a third switching element, a fourth switching element, a third pixel electrode electrically connected to the third switching element, and a fourth pixel electrode electrically connected to the fourth switching element, and
the third pixel electrode is provided between the second pixel electrode and the fourth pixel electrode,
an electrode area of the third pixel electrode is smaller than an electrode area of the second pixel electrode, and
an electrode area of the fourth pixel electrode is greater than the electrode area of the third pixel electrode.

(10) A display device comprising:
a light-emitting element;
a first substrate comprising a first transparent substrate, a first switching element and a second switching element, a first pixel electrode electrically connected to the first switching element, and a second pixel electrode electrically connected to the second switching element;

a second substrate comprising a transparent substrate comprising a side surface opposing the light-emitting element, and a common electrode overlapping the first pixel electrode and the second pixel electrode;

a liquid crystal layer provided between the first substrate and the second substrate and containing strip-shaped polymer and liquid crystal molecules;

a first transparent resin overlapping the first pixel electrode; and a second transparent resin overlapping the second pixel electrode, the first pixel electrode being provided between the light-emitting element and the second pixel electrode, an electrode area of the first pixel electrode being equivalent to an electrode area of the second pixel electrode, the first transparent resin and the second transparent resin being formed of a material different from that of the polymer and the liquid crystal molecules, and an overlapping area between the first pixel electrode and the first transparent resin being greater than an overlapping area between the second pixel electrode and the second transparent resin.

(11) The display device of any one of item (10), wherein the first substrate comprises a third switching element, a fourth switching element, a third pixel electrode electrically connected to the third switching element, and a fourth pixel electrode electrically connected to the fourth switching element, and the display device further comprises:

a third transparent resin overlapping the third pixel electrode, and a fourth transparent resin overlapping the fourth pixel electrode, the third pixel electrode is provided between the second pixel electrode and the fourth pixel electrode, an overlapping area between the third pixel electrode and the third transparent resin is greater than an overlapping area between the second pixel electrode and the second transparent resin, and an overlapping area between the fourth pixel electrode and the fourth transparent resin is smaller than an overlapping area of the third pixel electrode and the third transparent resin.

What is claimed is:
1. A display device comprising:
a light-emitting element;
a first substrate comprising a first transparent substrate, a first switching element, a second switching element, a first pixel electrode electrically connected to the first switching element, and a second pixel electrode electrically connected to the second switching element;
a second substrate comprising a second transparent substrate comprising a side surface opposing the light-emitting element, and a common electrode overlapping the first pixel electrode and the second pixel electrode; and
a liquid crystal layer provided between the first substrate and the second substrate and containing a polymer and liquid crystal molecules, wherein
the first pixel electrode is provided between the light-emitting element and the second pixel electrode,
an electrode area of the first pixel electrode is smaller than an electrode area of the second pixel electrode,
the first pixel electrode comprises a first opening,
the second pixel electrode comprises a second opening, and
a total area of the first opening is greater than a total area of the second opening.

2. The display device of claim 1, wherein
a full length of an outer circumferential edge of the first pixel electrode is equivalent to a full length of an outer circumferential edge of the second pixel electrode.

3. The display device of claim 2, wherein
the first substrate comprises first to fourth scanning lines and first and second signal lines that intersect the first to fourth scanning lines,
the first pixel electrode is provided in a first pixel surrounded by the first and second scanning lines and the first and second signal lines,
the second pixel electrode is provided in a second pixel surrounded by the third and fourth scanning lines and the first and second signal lines, and
an interval between the first scanning line and the second scanning line is equivalent to an interval between the third scanning line and the fourth scanning line.

4. The display device of claim 1, wherein
the common electrode comprises a third opening overlapping the first opening and a fourth opening overlapping the second opening.

5. The display device of claim 1, wherein
each of the first opening and the second opening extends along a same direction, and
the polymer is formed into a strip shape extending along an extending direction of the first and second openings.

6. The display device of claim 5, wherein
each of the first opening and the second opening has a width in a direction orthogonal to the extending direction, and
the width is greater than a thickness of the liquid crystal layer.

7. The display device of claim 1, wherein
the first substrate comprises a capacitive electrode overlapping the first pixel electrode and the second pixel electrode, and
an overlapping area between the first pixel electrode and the capacitive electrode is equivalent to an overlapping area between the second pixel electrode and the capacitive electrode.

8. A display device comprising:
a light-emitting element;
a first substrate comprising a first transparent substrate, a first switching element, a second switching element, a first pixel electrode electrically connected to the first switching element, a second pixel electrode electrically connected to the second switching element, and a capacitive electrode overlapping the first pixel electrode and the second pixel electrode;
a second substrate comprising a second transparent substrate comprising a side surface opposing the light-emitting element, and a common electrode overlapping the first pixel electrode and the second pixel electrode; and
a liquid crystal layer provided between the first substrate and the second substrate and containing a polymer and liquid crystal molecules, wherein
the first pixel electrode is provided between the light-emitting element and the second pixel electrode,
an electrode area of the first pixel electrode is smaller than an electrode area of the second pixel electrode,
the first pixel electrode comprises a first opening, the second pixel electrode comprises a second opening, and the capacitive electrode comprises openings overlapping the first opening and the second opening, respectively.

9. The display device of claim 8, wherein the first substrate comprises a plurality of scanning lines and a plurality of signal lines intersecting the plurality of scanning lines, and the capacitive electrode overlaps the plurality of scanning lines and the plurality of signal lines, and is formed into a grid pattern.

10. The display device of claim 1, wherein the first substrate comprises a third switching element, a fourth switching element, a third pixel electrode electrically connected to the third switching element, and a fourth pixel electrode electrically connected to the fourth switching element, and the third pixel electrode is provided between the second pixel electrode and the fourth pixel electrode, an electrode area of the third pixel electrode is smaller than an electrode area of the second pixel electrode, and an electrode area of the fourth pixel electrode is greater than the electrode area of the third pixel electrode.

11. The display device of claim 1, wherein the first substrate comprises a fifth switching element and a fifth pixel electrode electrically connected to the fifth switching element, the second pixel electrode is provided between the first pixel electrode and the fifth pixel electrode, and an electrode area of the second pixel electrode is greater than an electrode area of the fifth pixel electrode.

12. A display device comprising:

a light-emitting element;

a first substrate comprising a first transparent substrate, a first switching element, a second switching element, a first pixel electrode electrically connected to the first switching element, and a second pixel electrode electrically connected to the second switching element;

a second substrate comprising a transparent substrate comprising a side surface opposing the light-emitting element, and a common electrode overlapping the first pixel electrode and the second pixel electrode;

a liquid crystal layer provided between the first substrate and the second substrate and containing strip-shaped polymer and liquid crystal molecules;

a first transparent resin overlapping the first pixel electrode; and a second transparent resin overlapping the second pixel electrode, wherein the first pixel electrode is provided between the light-emitting element and the second pixel electrode, an electrode area of the first pixel electrode is equivalent to an electrode area of the second pixel electrode, the first transparent resin and the second transparent resin are formed of a material different from that of the polymer and the liquid crystal molecules, an overlapping area between the first pixel electrode and the first transparent resin is greater than an overlapping area between the second pixel electrode and the second transparent resin, and a transparency of the first transparent resin and the second transparent resin is higher than a transparency of the polymer.

13. The display device of claim 12, wherein a refractive index of the first transparent resin and the second transparent resin is equivalent to a refractive index of the polymer to ordinary ray.

14. The display device of claim 12, wherein the first transparent resin is formed into a columnar shape and is spaced apart from the first substrate or the second substrate.

15. The display device of claim 12, wherein the first substrate comprises a third switching element, a fourth switching element, a third pixel electrode electrically connected to the third switching element, and a fourth pixel electrode electrically connected to the fourth switching element, and the display device further comprises:

a third transparent resin overlapping the third pixel electrode, and a fourth transparent resin overlapping the fourth pixel electrode, the third pixel electrode is provided between the second pixel electrode and the fourth pixel electrode, an overlapping area between the third pixel electrode and the third transparent resin is greater than an overlapping area between the second pixel electrode and the second transparent resin, and an overlapping area between the fourth pixel electrode and the fourth transparent resin is smaller than an overlapping area of the third pixel electrode and the third transparent resin.

* * * * *